(12) United States Patent
Amarloo et al.

(10) Patent No.: US 11,303,086 B1
(45) Date of Patent: Apr. 12, 2022

(54) GENERATING RADIO FREQUENCY ELECTROMAGNETIC RADIATION

(71) Applicant: Quantum Valley Ideas Laboratories, Waterloo (CA)

(72) Inventors: Hadi Amarloo, Waterloo (CA); James P. Shaffer, Kitchener (CA)

(73) Assignee: Quantum Valley Ideas Laboratories, Waterloo (CA)

( * ) Notice: Subject to any disclaimer, the term of this patent is extended or adjusted under 35 U.S.C. 154(b) by 0 days.

(21) Appl. No.: 17/514,758

(22) Filed: Oct. 29, 2021

Related U.S. Application Data

(60) Provisional application No. 63/107,924, filed on Oct. 30, 2020.

(51) Int. Cl.
| | |
|---|---|
| *H01S 1/06* | (2006.01) |
| *H04B 10/61* | (2013.01) |
| *H04B 10/50* | (2013.01) |
| *H01S 3/06* | (2006.01) |

(52) U.S. Cl.
CPC .............. *H01S 1/06* (2013.01); *H01S 3/0602* (2013.01); *H04B 10/503* (2013.01); *H04B 10/61* (2013.01)

(58) Field of Classification Search
CPC ............ H01S 1/02–1/06; H01S 3/0602; H04B 10/503; H04B 10/61
See application file for complete search history.

(56) References Cited

U.S. PATENT DOCUMENTS

| | | | |
|---|---|---|---|
| 2,929,922 A | 3/1960 | Schawlow et al. | |
| 3,192,472 A | 6/1965 | Bender et al. | |
| 8,906,470 B2 | 12/2014 | Overstolz et al. | |
| 9,203,203 B2 * | 12/2015 | Benabid ............... | H01S 3/0323 |
| 10,605,840 B1 | 3/2020 | Amarloo et al. | |
| 10,859,981 B1 | 12/2020 | Ramirez-Serrano et al. | |
| 11,137,432 B1 | 10/2021 | Amarloo et al. | |
| 2005/0007118 A1 | 1/2005 | Kitching et al. | |

(Continued)

OTHER PUBLICATIONS

USPTO, Notice of Allowance dated Oct. 8, 2021, in U.S. Appl. No. 17/142,017, 23 pgs.

(Continued)

*Primary Examiner* — Xinning(Tom) Niu
(74) *Attorney, Agent, or Firm* — Henry Patent Law Firm PLLC

(57) ABSTRACT

In a general aspect, a system for generating radio frequency (RF) electromagnetic radiation includes a maser having a photonic crystal structure and a vapor. The photonic crystal structure is formed of dielectric material and includes an array of cavities having a defect region disposed therein and an elongated slot disposed in the defect region. The array of cavities and the elongated slot define a waveguide having a waveguide mode. The vapor is disposed in the elongated slot and includes one or more input electronic transitions and an output electronic transition coupled to the one or more input electronic transitions. The output electronic transition is operable to emit a target RF electromagnetic radiation and is resonant with the waveguide mode. The system also includes a laser system configured to provide input optical signals to the elongated slot and signal processing electronics in communication with the laser system.

30 Claims, 19 Drawing Sheets

(56) References Cited

U.S. PATENT DOCUMENTS

| | | |
|---|---|---|
| 2006/0147213 A1 | 7/2006 | Rosenwald et al. |
| 2011/0001063 A1 | 1/2011 | Barker et al. |
| 2011/0097045 A1* | 4/2011 | Benabid ............. G02B 6/02328 65/393 |
| 2014/0248020 A1* | 9/2014 | Fujita .................. G02B 6/1225 385/28 |
| 2016/0178843 A1* | 6/2016 | Fujita ..................... H01Q 1/00 385/14 |
| 2021/0114926 A1 | 4/2021 | Ramirez-Serrano et al. |
| 2021/0156898 A1 | 5/2021 | Amarloo et al. |
| 2021/0286063 A1 | 9/2021 | Amarloo et al. |

OTHER PUBLICATIONS

USPTO, Non-Final Office Action dated Jun. 15, 2021, in U.S. Appl. No. 17/142,017, 29 pgs.
USPTO, Notice of Allowance dated Jul. 21, 2021, in U.S. Appl. No. 17/142,012, 32 pgs.
Dharanipathy, "On the Investigation of Light-Matter Interactions in Slab Photonic Crystal Cavities", Thesis EPFL, Feb. 21, 2014, 186 pgs.
Dhillon, et al., "The 2017 terahertz science and technology roadmap", Journal of Physics D: Applied Physics, 2017, 49 pgs.
Withayachumnankul, et al., "Integrated Silicon Photonic Crystals Toward Terahertz Communications", Advanced Optical Materials 6.16, 2018, 7 pgs.
USPTO, Ex Parte Quayle action dated Jan. 5, 2022, in U.S. Appl. No. 17/514,819, 15 pgs.
WIPO, International Search Report and Written Opinion dated Dec. 30, 2021, in PCT/CA2021/051530, 9 pgs.
Anderson, et al., "An atomic receiver for AM and FM radio communication", arXiv:1808.08589v1, Aug. 26, 2018, 6 pgs.
Cox, et al., "Quantum-Limited Atomic Receiver in the Electrically Small Regime", arXiv:1805.09808v2, Jun. 19, 2018, 6 pgs.
Dmytryszyn, et al., "Lasers for Satellite Uplinks and Downlinks", Sci 2021, Jan. 4, 2021, 20 pgs.
Gregory, et al., "TESAT Laser Communication Terminal Performance Results on 5.6 GBIT Coherent Inter Satellite and Satellite to Ground Links", Int'l Conf. on Space Optics, Oct. 4, 2010, 6 pgs.
Meyer, et al., "Digital Communication with Rydberg Atoms & Amplitude-Modulated Microwave Fields", arXiv:1803.03545v2, Oct. 29, 2018, 10 pgs.
Moll, et al., "Demonstration of high-rate laser communications from fast airborne platform: flight campaign and results", Proc. of SPIE vol. 9248, 2014, 6 pgs.
Nozaki, et al., "Photonic-crystal nano-photodetector with ultrasmall capacitance for on-chip light-to-voltage conversion without an amplifier", Optica, vol. 3, No. 5, May 5, 2016, 10 pgs.
Riesing, "Development of a Pointing, Acquisition, and Tracking System for a Nanosatellite Laser Communications Module", MIT Thesis, Sep. 2015, 127 pgs.
Schuler, et al., "Graphene Photodetector Integrated on a Photonic Crystal Defect Waveguide", ACS Photonics, Nov. 13, 2018, 6 pgs.
Ziegler, "A Jam-Resistant CubeSat Communications Architecture", MIT Thesis, Jun. 2017, 140 pgs.
Fan, et al., "Atom based RF electric field sensing", Journal of Physics B: Atomic, Molecular and Optical Physics, Sep. 9, 2015, 17 pgs.
Gosele, et al., "Wafer bonding for microsystems technologies", Sensors and Actuators 74, 161-168, 1999, 8 pgs.
Lugiato, et al., "Connection between microscopic and macroscopic maser theory", PhysRevA 36,2, Jul. 15, 1987, 4 pgs.
Masteika, et al., "A Review of Hydrophilic Silicon Wafer Bonding", ECS Journal of Solid State Science and Technology, 3 (4) Q42-Q54, 2014, 13 pgs.
Moi, et al., "Rydberg-atom masers. I. A theoretical and experimental study of super-radiant systems in the millimeter-wave domain", PhysRevA 27, 4, Apr. 1983, 22 pgs.
Scullion, et al., "Slotted Photonic Crystal Sensors", Sensors 2013, 13, 3675-3710, Mar. 15, 2013, 36 pgs.
Sedlacek, et al., "Microwave electrometry with Rydberg atoms in a vapour cell using bright atomic resonances", Nature Physics 8, Nov. 2012, 6 pgs.
Suni, et al., "Effects of Plasma Activation on Hydrophilic Bonding of Si and SiO2", Journal of the Electrochemical Society, 149 (6) G348-G351, 2002, 4 pgs.
Vuckovic, "Quantum optics and cavity QED with quantum dots in photonic crystals", Lectures given at Les Houches 101th summer school on "Quantum Optics and Nanophysics", Aug. 2013, 37 pgs.
WIPO, International Search Report and Written Opinion dated Jan. 18, 2022, in PCT/CA2021/051529, 11 pgs.
Serpengüzel, "Transmission Characteristics of Metallodielectric Photonic Crystals and Resonators", IEEE Microwave and Wireless Components Letters, vol. 12, No. 4, Apr. 2002, 3 pgs.
Yablonovitch, "Inhibited Spontaneous Emission in Solid-State Physics and Electronics", PRL 58, 20, May 18, 1987, 4 pgs.

* cited by examiner

| frequency | a (lattice constant) | d (hole diameter) | h (silicon thickness) |
|---|---|---|---|
| 5 GHz | 15 mm | 9 mm | 9 mm |
| 20 GHz | 3.75 mm | 2.25 mm | 2.25 mm |
| 40 GHz | 1.9 mm | 1.1 mm | 1.1 mm |
| 82 GHz | 1.05 mm | 0.5 mm | 0.5 mm |
| 150 GHz | 0.5 mm | 0.3 mm | 0.3 mm |

FIG. 8

Diameters of these holes scaled to tune the mirror reflectivity

Scaling factor = 1

Reflection ≈ 97.8%

Scaling factor = 0.45

Reflection ≈ 88.5%

| Scaling Factor | Reflectivity (%) |
|---|---|
| 0.45 | 88.5 |
| 0.5 | 91.2 |
| 0.55 | 94.9 |
| 0.65 | 96.5 |
| 0.75 | 97.4 |
| 1 | 97.8% |

FIG. 9D

GENERATING RADIO FREQUENCY ELECTROMAGNETIC RADIATION

CROSS-REFERENCE TO RELATED APPLICATIONS

This application claims priority to U.S. Provisional Application No. 63/107,924, which was filed on Oct. 30, 2020 and entitled, "Photonic Crystal Maser." The disclosure of this priority application is hereby incorporated by reference in its entirety.

BACKGROUND

The following description relates to generating radio frequency electromagnetic radiation.

Masers produce coherent electromagnetic radiation through stimulated emission by atoms or molecules from a higher energy state to a lower energy state. The stimulated emission produces electromagnetic radiation at an emission frequency of the atoms or molecules that builds up in a resonator. A resonator may be used to capture a portion of the stimulated emission from the atoms or molecules so that the photons in the resonator can stimulate more emission into the resonator mode from excited atoms or molecules. To do so, the resonator may have a mode of oscillation that corresponds to the emission frequency of the atoms and molecules, thereby allowing the resonator to "resonate" with the atoms or molecules. The resonator may thus store energy—and by coherent, stimulated emission—amplify the emission of electromagnetic energy from the maser.

DESCRIPTION OF DRAWINGS

FIG. 8 is a table of example design parameters for a photonic crystal maser;

FIG. 9D is a table of reflectivity values for the photonic crystal mirror of FIG. 9A resulting from various scaling factors;

DETAILED DESCRIPTION

Figure 1A:
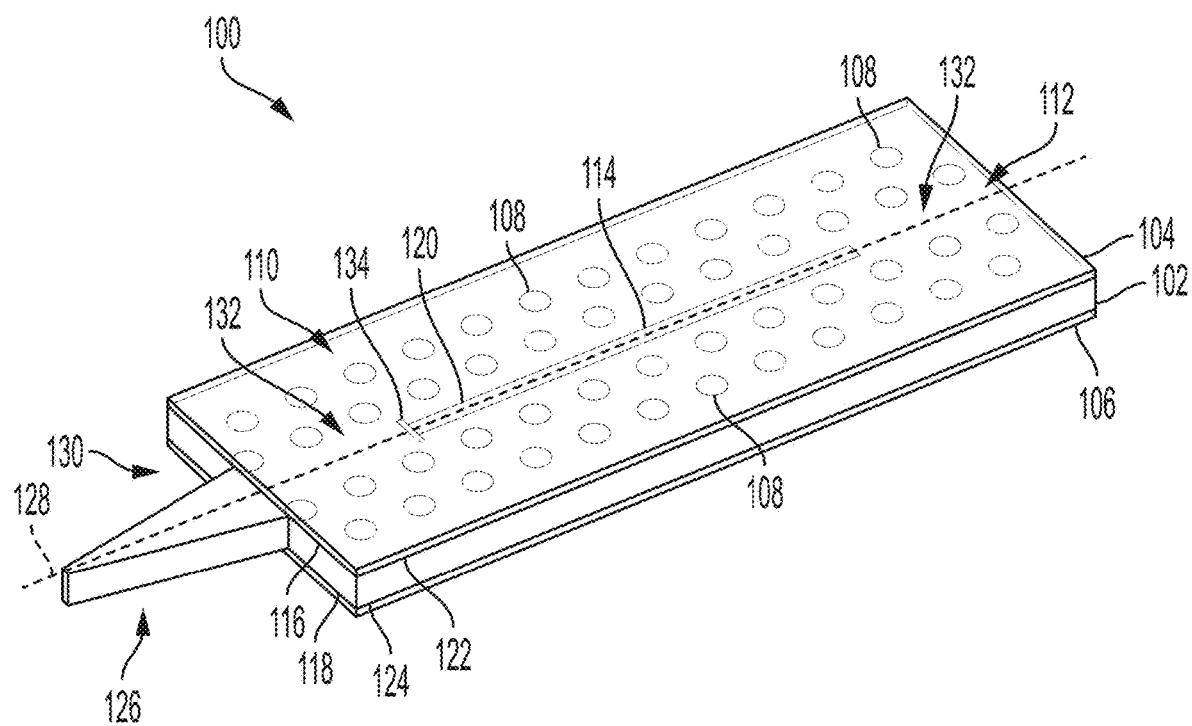
FIG. 1A is a schematic diagram, in perspective view, of an example photonic crystal maser that includes a dielectric body bonded to two optical windows.

In a general aspect, a photonic crystal maser is disclosed that includes a photonic crystal structure and a vapor therein. For example, the photonic crystal maser may include a dielectric body having an array of cavities ordered periodically to define a photonic crystal structure in the dielectric body. The dielectric body may also include a region in the array of cavities defining a defect in the photonic crystal structure. An elongated slot through the region extends from a slot opening in a surface of the dielectric body at least partially through the dielectric body. The photonic crystal maser may also include a vapor (or a source of the vapor) in the elongated slot and an optical window covering the elongated slot. The optical window has a window surface bonded to the surface of the dielectric body to form a seal about the slot opening. In doing so, the optical window may define the vapor cell with the dielectric body. In some variations, the photonic crystal structure and the elongated slot are configured to be resonant with an electronic transition of the vapor (e.g., a Rydberg transition, an atomic transition, a molecular transition, etc.). In some variations, an optical mirror is placed at one or both ends of the elongated slot. In some variations, a photonic crystal mirror is placed at one or both ends of the elongated slot. Other configurations of the photonic crystal maser are possible, as described below.

In some implementations, a photonic crystal maser may be constructed by creating a photonic crystal frame (or structure) and then bonding one or two optical windows to the frame. These components may be bonded to each other using techniques described in U.S. Pat. No. 10,859,981 entitled "Vapor Cells Having One or More Optical Windows Bonded to a Dielectric Body," and U.S. Pat. No. 11,137,432 entitled "Photonic Crystal Receivers," the disclosures of which, are incorporated herein by reference in their entirety. For example, a contact bonding method may be used to bond the photonic crystal frame to one or both optical windows. Moreover, an adhesion layer may be used to facilitate bonding the photonic crystal frame to one or both optical windows (e.g., an adhesion layer formed of silicon or silicon dioxide).

The photonic crystal frame and optical windows may be formed of dielectric material. For example, the photonic crystal frame may be formed from silicon and the optical windows may be formed from glass (e.g., a borosilicate glass, a fused silica glass, etc.). As another example, the photonic crystal frame, the optical windows, or both may be formed of $BaLn_2Ti_4O_{12}$ (BLT) where Ln corresponds to one or more elements selected from the lanthanide elements. In many variations, the optical windows are transparent to laser light used to pump the maser. This transparency may occur throughout an optical window, or alternatively, be limited to a portion of the optical window, such as a portion covering the elongated slot.

In some implementations, the vapor includes gaseous atoms, molecules, or both. The vapor, or generally emitters, is located in the elongated slot centered in a defect of the photonic crystal (e.g., a linear defect). This location allows the vapor to experience a different electromagnetic mode environment than in free space. In many variations, the mode structure of the electromagnetic field is modified by the presence of the photonic crystal frame. The photonic crystal frame may also be designed to slow an electromagnetic wave by increasing the group velocity index of refraction at and around a specific design frequency. Slowing the electromagnetic wave may increase the stimulated emission rate of the emitters into that mode by increasing the energy density in the cavity relative to free-space. The slowed electromagnetic wave may be largely confined to the elongated slot, which may further intensify the electromagnetic field (e.g., by modifying the resonant mode).

One advantage of this configuration is that the slowing and concentration of the electromagnetic field can lower the masing threshold by increasing the emission rate into the resonant mode. Such lowering allows maser action at lower gain since the gain threshold is lowered. The local field modes at the resonant frequency may be designed to correspond to a specific transition frequency of the vapor residing in the elongated slot. In some instances, color centers or other materials may be placed in the elongated slot. The rate of emission into these modes can be significantly increased relative to emission into other electromagnetic field modes, for example, modes corresponding to directions orthogonal to the elongated slot or other frequencies.

In some instances, a maser is initiated by creating an inversion on a high lying transition of the emitters placed inside the elongated slot, such as by laser excitation of a high lying Rydberg state. For example, a pump laser(s) can be coupled into the elongated slot using mirrors and fiber optics. Spontaneous emission into the slot-photonic crystal mode triggers an avalanche of stimulated emission into this mode, creating a maser. The masing process may produce a coherent, directed source of electromagnetic waves at the design frequency. The ends of the elongated slot and photonic crystal frame can be constructed as mirrors for the maser by changing the geometry of the photonic crystal. Moreover, multiple passes of the wave through the elongated slot can be designed into the structure allowing for greater amplification of the electromagnetic wave. In some variations, a taper located adjacent to the output mirror can be used to couple the output electromagnetic wave to free space and shape the output beam. Other structures for shaping the beam at the output are possible, such as a lens. The device may be amplitude modulated by modulating the pumping (e.g., modulating an intensity of the laser light).

In some implementations, low temperature contact bonding is used for vacuum sealing, such as described in U.S. Pat. Nos. 10,859,981 and 11,137,432. One of the optical windows—or a fill hole in one of the optical windows—can be contact bonded so that the atomic sample remains pure. Other methods of bonding may require high temperatures and/or voltages be applied to the vapor cell leading to significant outgassing, which can compromise the performance of the maser due to collisions. In certain cases, a small stem may be used for filling the vapor cell. In these cases, the optical windows can be anodically bonded to the frame. The structure is made of all-dielectric materials. Such construction allows the maser to be used for over-the-air testing in anechoic chambers as a signal source or used in directional communications systems. The maser may also be used as a clock, or frequency reference, and as a local oscillator for signal processing in receiver applications. Furthermore, the maser may be integrated with the principles of Rydberg atom electrometry to construct a joint emitter-receiver in accordance with the disclosure herein.

In some implementations, the photonic crystal masers may produce coherent radiation in the radio frequency (RF) regime (e.g., 100 MHz-1 THz), and as such, may function similar to a laser emitting radio-frequency (RF) electromagnetic radiation. In some variations, the regime ranges from 20 kHz to 1 THz. In further variations, the regime ranges from 20 kHz to 300 GHz. The photonic crystal maser may include a monolithic photonic crystal frame, with a vapor cell incorporated therein, to construct a maser that can produce powers up to about 100 nW. Although the power is low, the device may be fabricated from dielectric materials and can be used to produce directed RF signals for over-the-air testing and communications. The emitted beam can be directional and coherent, allowing propagation for long distances without the spatial spread commonly produced by antennas. Such spatial spread leads to a $R^{-2}$ reduction in the beam intensity, where R is the propagation distance. The dielectric construction of the photonic crystal maser allows it to sit in an anechoic chamber and produce modulated RF signals for testing without significantly perturbing the environment. Photonic crystal masers can also be used for timing and frequency referencing, RF spectroscopy, or as a local oscillator in conjunction with a Rydberg atom-based receiver or other type of conventional receiver.

In some examples, a photonic crystal maser includes the photonic crystal structure (or frame) and a fiber optic circuit to channel pump laser light into an elongated slot of the photonic crystal structure. The photonic crystal maser may also include one or more pump lasers and electronics to control these lasers. The electronics may also control an output coupler, or other structure, to shape (e.g., collimate)

the output beam from the pump laser and impedance match the output beam to a propagation medium.

For example, FIG. 1A presents a schematic diagram, in perspective view, of an example photonic crystal maser 100 that includes a dielectric body 102 bonded to two optical windows 104, 106. The dielectric body 102 includes an array of cavities 108 ordered periodically to define a photonic crystal structure 110 in the dielectric body 102. For example, the cavities 108 of the array may be disposed on respective sites of a two-dimensional lattice, such as an oblique lattice, a square lattice, a rectangular lattice, a hexagonal lattice, a rhombic lattice, and so forth. In FIG. 1A, each cavity 108 is defined by a through-hole. However, other shapes are possible for the cavities 108 (e.g., blind holes, internal voids, etc.), including combinations of shapes. The dielectric body 102 also includes a region 112 (or defect region) in the array of cavities 108 defining a defect in the photonic crystal structure 110. The region may be defined by an absence of cavities 108 on two or more contiguous sites of a two-dimensional lattice. In FIG. 1A, the region 112 is a linear region having a row of cavities 108 absent. However, other geometries are possible, including curved, circular, elliptical, serpentine, square, rectangular, hexagonal, and so forth.

The dielectric body 102 may be formed of a material substantially transparent to RF electromagnetic radiation. The material may be an insulating material having a high resistivity, e.g., $\rho > 10^3$ $\Omega \cdot cm$, and may also correspond to a single crystal material, a polycrystalline material, or an amorphous (or glass) material. For example, the dielectric body 102 may be formed of silicon. In another example, the dielectric body 102 may be formed of a glass that includes silicon oxide (e.g., $SiO_2$, $SiO_x$, etc.), such as vitreous silica, a borosilicate glass, or an aluminosilicate glass. In some instances, the material of the dielectric body 102 is an oxide material such as magnesium oxide (e.g., MgO), aluminum oxide (e.g., $Al_2O_3$), silicon dioxide (e.g., $SiO_2$), titanium dioxide (e.g., $TiO_2$), zirconium dioxide, (e.g., $ZrO_2$), yttrium oxide (e.g., $Y_2O_3$), lanthanum oxide (e.g., $La_2O_3$), and so forth. The oxide material may be non-stoichiometric (e.g., $SiO_x$), and may also be a combination of one or more binary oxides (e.g., $Y:ZrO_2$, $LaAlO_3$, etc.). In certain variations, the combination may correspond to $BaLn_2Ti_4O_{12}$ where Ln refers to one or more elements from the lanthanide group of the periodic table of elements. In other instances, the material of the dielectric body 102 is a non-oxide material such as silicon (Si), diamond (C), gallium nitride (GaN), calcium fluoride (CaF), and so forth.

The dielectric body 102 additionally includes an elongated slot 114 through the region 112 extends from a slot opening in a surface of the dielectric body 102 at least partially through the dielectric body. In FIG. 1A, the elongated slot 114 extends completely through dielectric body 102 to a second slot opening. The array of cavities 108 and the elongated slot 114 define a waveguide having a waveguide mode. During operation, the waveguide may direct radio frequency (RF) electromagnetic radiation (or waves thereof) along an axis of the region 112, such as towards an end of the dielectric body 102.

The example photonic crystal maser 100 also includes a vapor (or a source of the vapor) in the elongated slot 114. The vapor may include constituents such as a gas of alkali-metal atoms, a noble gas, a gas of diatomic halogen molecules, or a gas of organic molecules. For example, the vapor may include a gas of alkali-metal atoms (e.g., K, Rb, Cs, etc.), a noble gas (e.g., He, Ne, Ar, Kr, etc.), or both. In another example, the vapor may include a gas of diatomic halogen molecules (e.g., $F_2$, $Cl_2$, $Br_2$, etc.), a noble gas, or both. In yet another example, the vapor may include a gas of organic molecules (e.g., acetylene), a noble gas, or both. Other combinations for the vapor are possible, including other constituents. The source of the vapor may generate the vapor in response to an energetic stimulus, such as heat, exposure to ultraviolet radiation, irradiation by laser light, and so forth. For example, the vapor may correspond to a gas of alkali-metal atoms and the source of the vapor may correspond to an alkali-metal mass sufficiently cooled to be in a solid or liquid phase when disposed into the elongated slot 114.

In many implementations, the vapor has electronic transitions that are defined between pairs of electron energy levels (e.g., a Rydberg transition, an atomic transition, a molecular transition, etc.). In particular, the vapor includes one or more input electronic transitions and an output electronic transition coupled to the one or more input electronic transitions. The output electronic transition is operable to emit a target RF electromagnetic radiation and is resonant with one or more waveguide modes of the waveguide. Examples of electronic transitions are described further in relation to FIG. 2. In some implementations, the example photonic crystal structure 100 includes a laser (e.g., a pump laser) configured to generate an optical signal capable of exciting the one or more input electronic transitions of the vapor. However, other energy sources are possible (e.g., a source of radio-frequency photons). In some implementations, the output electronic transition is operable to emit a target RF electromagnetic radiation having a frequency in a range from 100 MHz to 1 THz.

The photonic crystal structure 110 may define a photonic band gap for the target RF electromagnetic radiation in the waveguide. The photonic band gap may be for a transverse magnetic (TM) mode, a transverse electric (TE) mode, or both, of the target RF electromagnetic radiation in the waveguide. The photonic band gap may allow the photonic crystal structure 110 to influence properties of the target RF electromagnetic radiation. For example, the photonic crystal structure 110 may be configured to concentrate the target RF electromagnetic radiation in the elongated slot 114. The photonic crystal structure 110 may also be configured to decrease a group velocity of the target RF electromagnetic radiation (or waves thereof) along a direction of the elongated slot 114 (e.g., along an axis of the elongated slot 114). Such influence may allow the photonic crystal structure 110 to control an absorption and emission of photons by the vapor. Examples of absorption and emission are described further in relation to FIGS. 3A-5 and 7A-9D.

In some implementations, the elongated slot 114 extends partially through the dielectric body 102 and the dielectric body 102 includes a surface defining a slot opening of the elongated slot 114. In these implementations, the example photonic crystal receiver 100 includes an optical window (e.g., optical window 104) that covers the elongated slot 114 and has a window surface bonded to the surface to form a seal about the slot opening. Such sealing may assist the optical window and dielectric body in sealing the vapor (or the source of the vapor) in the elongated slot 114, thereby defining a vapor cell within the region 112. The optical window may be bonded to the dielectric body 152 using a contact bond, an anodic bond, a glass frit bond, and so-forth. Such bonds may be formed using techniques described in U.S. Pat. No. 10,859,981 entitled "Vapor Cells Having One or More Optical Windows Bonded to a Dielectric Body," the disclosure of which, is incorporated herein by reference in its entirety.

The optical window may be formed of a material that is transparent to electromagnetic radiation (e.g., laser light) used to stimulate the vapor to emit the target RF electromagnetic radiation. For example, the optical window may be transparent to infrared wavelengths of electromagnetic radiation (e.g., 700-5000 nm), visible wavelengths of electromagnetic radiation (e.g., 400-700 nm), or ultraviolet wavelengths of electromagnetic radiation (e.g., 10-400 nm). Moreover, the material of the optical window may be an insulating material having a high resistivity, e.g., $\rho > 10^3$ $\Omega \cdot cm$, and may also correspond to a single crystal material, a polycrystalline material, or an amorphous (or glass) material. For example, the material of the optical window may include silicon oxide (e.g., $SiO_2$, $SiO_x$, etc.), such as found within quartz, vitreous silica, or a borosilicate glass. In another example, the material of the optical window 166 may include aluminum oxide (e.g., $Al_2O_3$, $Al_xO_y$, etc.), such as found in sapphire or an aluminosilicate glass. In some instances, the material of the optical window is an oxide material such as magnesium oxide (e.g., MgO), aluminum oxide (e.g., $Al_2O_3$), silicon dioxide (e.g., $SiO_2$), titanium dioxide (e.g., $TiO_2$), zirconium dioxide, (e.g., $ZrO_2$), yttrium oxide (e.g., $Y_2O_3$), lanthanum oxide (e.g., $La_2O_3$), and so forth. The oxide material may be non-stoichiometric (e.g., $SiO_x$), and may also be a combination of one or more binary oxides (e.g., $Y:ZrO_2$, $LaAlO_3$, $BaLn_2Ti_4O_{12}$, etc.). In other instances, the material of the optical window is a non-oxide material such as diamond (C), calcium fluoride (CaF), and so forth.

In some implementations, the surface of the dielectric body 102 defines a cavity opening for each of the array of cavities 108. The optical window may or may not cover each of the cavity openings. In implementations where the optical window does cover each of the cavity openings, the window surface of the optical window may form a seal about each of the cavity openings. In some implementations, the window surface of the optical window is a first window surface, and the optical window includes a second window surface opposite the first window surface. In such implementations, the example photonic crystal maser 100 may include a dielectric plate separated from the second window surface by a gap. The dielectric plate may be a plate body formed of dielectric material, such as described above in relation to the optical window. The dielectric plate and its effects on a band edge of the photonic crystal structure 110 are described further in relation to FIGS. 4A and 4B.

In some implementations, the elongated slot 114 extends entirely through the dielectric body 102. For example, as shown in FIG. 1A, the dielectric body 102 may include a first surface 116 opposite a second surface 118 and the elongated slot 114 extends through the dielectric body 102 from the first surface 116 to the second surface 118. The first surface 116 may define a first slot opening 120 for the elongated slot 114 and the second surface 118 may define a second slot opening (not shown) for the elongated slot 114. In these implementations, the example photonic crystal maser 100 includes first and second optical windows 104, 106 covering, respectively, the first and second slot openings of the elongated slot 114. The first and second optical windows 104, 106 each have a window surface bonded to the surface of the dielectric body 102 and may seal the vapor (or the source of the vapor) in the elongated slot 114 to define a vapor cell. In such cases, the first optical window 104 may cover the first slot opening 120 and may have a first window surface 122 bonded to the first surface 116 of the dielectric body 102 to form a seal about the first slot opening 120. Similarly, the second optical window 106 may cover the second slot opening and may have a second window surface 124 bonded to the second surface 118 of the dielectric body 102 to form a seal about the second slot opening.

In implementations where the example photonic crystal maser 100 includes first and second optical windows 104, 106, the first and second surfaces 116, 118 of the dielectric body 102 may define, respectively, first and second cavity openings for each of the array of cavities 108. In these implementations, the first and second optical windows 104, 106 may or may not cover, respectively, each of the first and second cavity openings. In implementations where they do, the first window surface 122 may form a seal about each of the first cavity openings and the second window surface may form a seal about each of the second cavity openings.

In some implementations, the example photonic crystal maser 100 includes an impedance-matching structure 126 configured to impedance match the target RF electromagnetic radiation to an ambient environment of the photonic crystal maser 100. In these implementations, the region 112 in the array of cavities 108 may extend along an axis 128 and the elongated slot 114 may be aligned parallel to the axis 128 (e.g., be coincident with the axis 128). The dielectric body 102 then includes the impedance-matching structure 126, which may extend from an end 130 of the dielectric body 102 and be aligned with the axis 128. The impedance-matching structure 126 may be an integral part of the dielectric body 102 but may also be a separate body. If separate, the impedance-matching structure 126 may be formed of dielectric material. However, the impedance-matching structure 126 may also be a conventional coupler formed of metal. FIG. 1A shows the impedance matching structure 126 as a protrusion from the dielectric body 102 that terminates in a taper. However, other geometries for the impedance-matching structure 126 are possible.

In some implementations, the impedance-matching structure 126 is electromagnetically coupled to an output mirror, such as a photonic crystal mirror 132, to impedance match an output beam to a medium (e.g., air) in which the output beam is intended to propagate. The photonic crystal mirror 132 may be defined by one or more offset cavities spatially offset from an ideal periodic position in the array. The one or more offset cavities may reside nearest an end of the elongated slot 114 (e.g., end 130) and have respective spatial offsets away from the end of the elongated slot 114. The one or more offset cavities may also reside nearest a side of the elongated slot 114 and have respective spatial offsets away from the side of the elongated slot 114. Other locations are possible. A lens may also be added to collimate the output beam. In some implementations, a polarizer may be added to the impedance-matching structure 126 to filter a polarization of the output beams. For example, the impedance-matching structure 126 may terminate in a tapered end and include a narrow portion aligned with the tapered end. An array of co-planar segments may extend outward from the narrow portion and have a periodic spacing therealong. The array of co-planar segments is configured to filter a polarization of the target RF electromagnetic radiation.

In some implementations, the photonic crystal mirror 132 is placed at one or both ends of the elongated slot 114. FIG. 1A shows the case in which the photonic crystal mirror 132 is present at both ends of the elongated slot 114. The presence of the photonic crystal mirror 118 may increase the output power, may lower the gain threshold of the maser, or both. For example, the photonic crystal mirror 132 may reflect electromagnetic radiation that traverses the region 112 during operation (e.g., the target RF electromagnetic radiation emitted by the vapor during operation of the example photonic crystal maser 100). In this capacity, the region 112 may serve as part of a maser cavity, such as the interior of a maser cavity. Moreover, the photonic crystal mirror 132 may assist the array of cavities 108 and the elongated slot 114 in defining a cavity structure (e.g., a slot waveguide) for electromagnetic radiation emitted by the vapor.

In many variations, the photonic crystal mirror 132 corresponds to an alteration in the dimensional characteristics of the photonic crystal structure 110 near an end of the elongated slot 114. For example, transmission of the target RF electromagnetic radiation through the photonic crystal structure 110 at the ends of the elongated slot 114 can be altered by changing a spacing of cavities 108 in the array, a thickness of the dielectric body 102, a diameter of the cavities 108 in the array, and so forth. It will be appreciated that, in the dielectric body 102, a perfect photonic crystal geometry for the target RF electromagnetic radiation (or resonant wave) may act as a perfect reflector, while the absence of the photonic crystal may act as a perfect transmitter.

In some implementations, the photonic crystal mirror 132 is configured with a reflectivity greater than 80% for frequencies of electromagnetic radiation at or near a cavity resonant frequency, $\omega_c$, of the photonic crystal structure 110. This reflectivity may increase a cavity quality factor, Q, associated with the photonic crystal structure 110 (or region 112 therein), thereby lowering a threshold condition for masing to take place. The threshold condition for masing is discussed further below in relation to Eqs. (1)-(2). In some variations, the reflectivity is greater than 85%. In some variations, the reflectivity is greater than 90%. In some variations, the reflectivity is greater than 92%. In some variations, the reflectivity is greater than 94%. In some variations, the reflectivity is greater than 96%.

In some implementations, an optical mirror 134 is placed at one or both ends of the elongated slot 114. The optical mirror 134 may be angled relative to an optical pathway defined by the elongated slot 114, or alternatively, be angled perpendicular to the optical pathway. The optical mirror 134 may serve to guide optical signals along a longitudinal axis of the elongated slot, such as axis 128. To do so, the optical mirror 134 may include surfaces configured to reflect such optical signals. The optical signals may include light received into the elongated slot 114 from the laser.

In some implementations, the vapor is a vapor of atoms in which each atom can function as an emitter. During operation, the photonic crystal structure 110, which surrounds the elongated slot 114, may slow and concentrate an electromagnetic wave at an atomic transition frequency of the atoms. The atoms are pumped with the laser(s) so that a population inversion is established on an atomic u→l transition, which is resonant with a resonant mode (or waveguide mode) of the waveguide. Emission of radiation into the resonant mode of the waveguide can be enhanced because the electric field is stronger, favoring emission. Stimulated emission dominates, creating a coherent directed maser beam along the waveguide that can be impedance matched and shaped for free-space propagation. Photonic crystal mirrors can be implemented at the ends of the elongated slot 114 so the radiation can propagate back and forth in the elongated slot 114 and be further amplified. The elongated slot 114 takes the energy stored in the population inversion and causes it to be emitted into the waveguide mode resulting in a coherent, directed beam of radiation. Analogous operation is possible for implementations of the example photonic crystal maser 100 in which the vapor is a vapor of molecules.

The example photonic crystal maser 100 may be constructed in a manner suitable for mass production. The example photonic crystal maser 100 may also be combined with a Rydberg atom receiver, Rydberg atom vapor cell sensor, or array of Rydberg atom vapor cell sensors to create devices that can receive and transmit RF radiation. The amount of power outputted by the example photonic crystal maser 100 may be controlled to extraordinarily low levels by changing an intensity of the laser. Moreover, the switching time may be nanoseconds because cavity lifetimes can be on this scale (see also description relation to Eq. (6)). Because of the nanosecond lifetimes and the ability to modulate the laser at GHz bandwidths, modulating the laser can imprint baseband modulations on the carrier frequency on the same frequency scale (e.g., GHz).

Figure 1B:
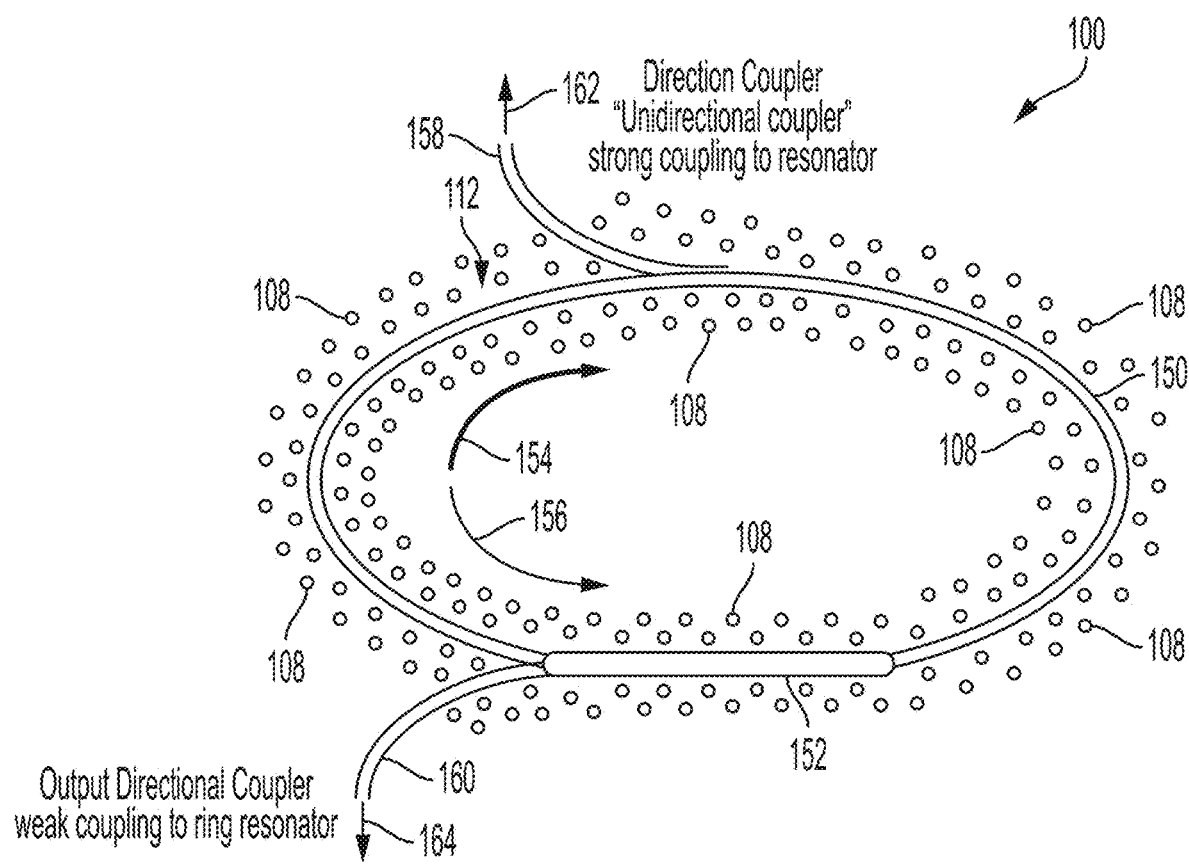
FIG. 1B is a schematic diagram, in top view, of the example photonic crystal receiver of FIG. 1A, but in which the dielectric body includes a ring resonator structure.

Although FIG. 1A depicts the example photonic crystal maser 100 as having a linear region 112 and a linear elongated slot 114, other geometries are possible. For example, FIG. 1B presents a schematic diagram, in top view, of the example photonic crystal receiver 100, but in which dielectric body 102 includes a ring resonator structure. In particular, the region 112 forms a loop (e.g., an elliptical loop) in the array of cavities 108. In many variations, the loop is a closed loop, such as circle, an ellipse, an oblong, and so forth. The elongated slot 114 extends along a loop axis (e.g., an elliptical axis) of the loop to form a looped slot 150 (e.g., an elliptical slot). All or a portion of the looped slot 150 may be partitioned off (e.g., by transparent walls, lenses, mirrors, etc.) to contain the vapor or the source of the vapor. FIG. 1B shows the case in which a portion 152 of the looped slot 114 contains the vapor or the source of the vapor. In some variations, such as shown in FIG. 1B, the array of cavities 108 forms a loop. However, other distributions are possible for the array of cavities 108.

The looped slot 150 may be associated with first and second loop directions 154, 156 along the loop axis, with the first loop direction 154 being opposite the second loop direction 156. In these configurations, the looped slot 150 includes first and second RF ports 158, 160. First and second directional couplers 162, 164 are coupled to, respectively, the first and second RF ports 158, 160. The first directional coupler 162 is configured to receive a first portion of the target RF electromagnetic radiation traveling along the first loop direction, and the second directional coupler 164 is configured to receive a second portion of the target RF electromagnetic radiation traveling along the second loop direction. In many variations, the first directional coupler 162 is more strongly coupled to the looped slot 150 than the second directional coupler 164.

A looped configuration for the region 112 and elongated slot 112 may bring some advantages over a linear configuration in certain cases. For example, the linear configuration allows the target RF electromagnetic radiation, when emitted, to travel principally along two opposite directions, such as along a linear axis of the elongated slot 114. During such travel, the target RF electromagnetic radiation may be amplified by interacting with the vapor, which can operate as a gain medium. However, this dual-direction travel may also allow photons associated with the traveling target RF electromagnetic radiation—e.g., waves of photons traveling forwards and backwards in the elongated slot 114—to interfere with each other and establish a standing wave of the target RF electromagnetic radiation in the elongated slot 114. This standing wave is associated with a series of minimum and maximum field intensities along a length of the elongated slot 114. The minimums may result little to no stimulated emission at some portions of the vapor while the maximums may saturate the emission at other portions. The maximums may be particularly undesirable if their electromagnetic field energy is greater than can be absorbed by the vapor at their locations. As a result, the standing wave of target RF electromagnetic radiation may not efficiently use the vapor in the elongated slot 114. The target RF electromagnetic radiation may saturate the output power at lower magnitudes of field strength than if all the vapor were used.

In contrast, the looped configuration can, in certain cases, more efficiently use the vapor by incorporating directional couplers and establishing a traveling wave of the target RF electromagnetic radiation. For example, a high-efficiency directional coupler (e.g., first directional coupler 162) may serve as a unidirectional device at the first RF port 158 of the looped slot 150 and a low-efficiency directional coupler (e.g., second directional coupler 164) can be used as an output coupler at the second RF port 160 of the looped slot 150. In the looped configuration, first photons circulating in the first loop direction 154 (e.g., a clockwise direction) are coupled out of the looped waveguide with low-efficiency and second photons circulating in the second loop direction 156 (e.g., a counterclockwise direction) are coupled out of the cavity with high efficiency. The loss of the second photons is designed to be enough that second photons, when interacting with the vapor, do not reach the masing threshold. In contrast, the first photons are strong enough so that, when interacting with the vapor, the first photons extract all the energy from the gain medium. In this situation, the target RF electromagnetic radiation forms a traveling wave (especially in the vapor) and the entire vapor can therefore be used as a gain medium to provide energy for masing. Moreover, the traveling wave allows the vapor to be selectively constrained within a portion of the looped slot 150. An entire volume of the looped slot 150 need not be filled with the vapor. The portion may be selected in length and position to maximize a participation of the vapor in stimulated emission.

Figure 2:
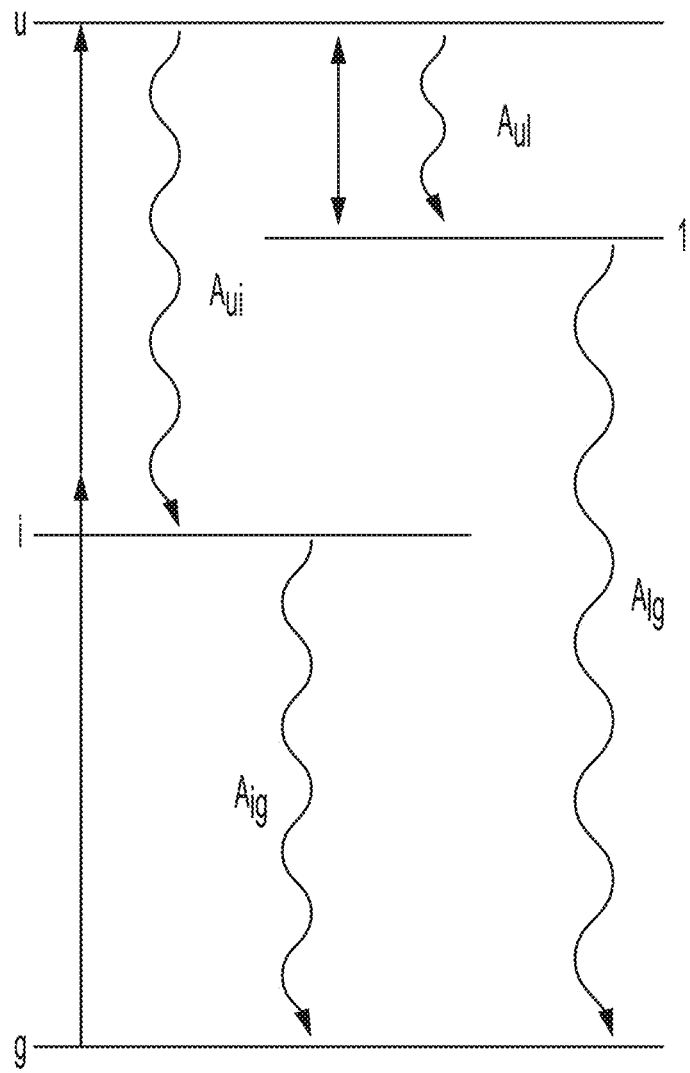
FIG. 2 is a schematic diagram of example energy levels for a Rydberg atom maser.

Now referring to FIG. 2, a schematic diagram is presented of example energy levels for a Rydberg atom maser, such as for the example photonic crystal maser 100 of FIGS. 1A and 1B. The coefficients, $A_{ij}$, are Einstein A coefficients. The wavy arrows show radiative decay pathways while the solid arrows show excited transitions induced by lasers (or pump lasers). In FIG. 2, two excitation pathways are depicted. However, the lasers do not have to be resonant with the two-photon process (or two excitation pathways). Single photon or other types of multi-photon excitations are also possible. In such cases, the allowed transitions change because the parity of the two states involved in any dipole transition must change during excitation or decay. The energy levels u and l are Rydberg states in cases where the vapor consists of atoms.

The laser creates a population inversion on a transition of the emitters located in a waveguide of the photonic crystal structure (e.g., a vapor in an elongated slot residing within the photonic crystal structure). In FIG. 2, a portion of the population of emitters is pumped to level u, creating an inversion on the u→l transition. Most of the population resides in state g. The decay from u→i and i→g corresponds to spectator transitions as these decays, the detuning of the lasers from i, and the Rabi frequencies of the near-resonant lasers determine the population in u. A two-photon excitation scheme consistent with Rydberg atom-sensing is shown in FIG. 2, since the sensing lasers can also be used to pump the maser in situations where a signal source and a receiving sensor are needed. Single photon or other multi-photon pumping schemes may also be implemented. For the pumping scheme to work, which may include creating an inversion on the u→l transition, the magnitude of $A_{ul}$ should be less than $A_{lg}$ (i.e., $A_{ul} < A_{lg}$) and preferably much less than $A_{lg}$ (i.e., $A_{ul} \ll A_{lg}$). In the case of gaseous atoms, the transition u→l is a Rydberg transition, so its frequency is in the RF band. The photonic crystal and waveguide are designed to be resonant with the RF transition u→l. For the example energy levels shown in FIG. 2, energy levels i and l have the same parity. Moreover, energy levels u and g have the same parity. It will be appreciated that spontaneous emission or dipole coupling between energy levels requires a change in parity.

In many variations, the photonic crystal structure and elongated slot are configured to be resonant with the u→l transition. In these variations, the electromagnetic field associated with the resonant RF transition (or output electronic transition of the vapor) is enhanced in the photonic crystal structure, and especially in the elongated slot. This enhancement may increase the radiation rate into the associated waveguide mode relative to others (e.g., those at the same frequency or from competing transitions). The combination of the holes (or cavities) in the photonic crystal structure and the elongated slot in the dielectric body may define a waveguide. As such, the slowing due to the photonic crystal structure and the concentration of the electromagnetic field in the elongated slot can operate in tandem to modify the radiation field so that the vapor located in the elongated slot is more likely to radiate into the waveguide mode of the waveguide. The waveguide may be designed such that the waveguide mode is matched to the radiance (or emission) of the vapor. The radiation is linearly polarized to couple to the waveguide. The enhanced coupling lowers the threshold gain for masing action to occur. Once emission into the masing mode begins it is amplified by stimulated emission on the resonant transition causing the vast majority (or all) of the energy stored in the upper level, u, to be emitted coherently into the waveguide mode of the waveguide.

Figure 3A:
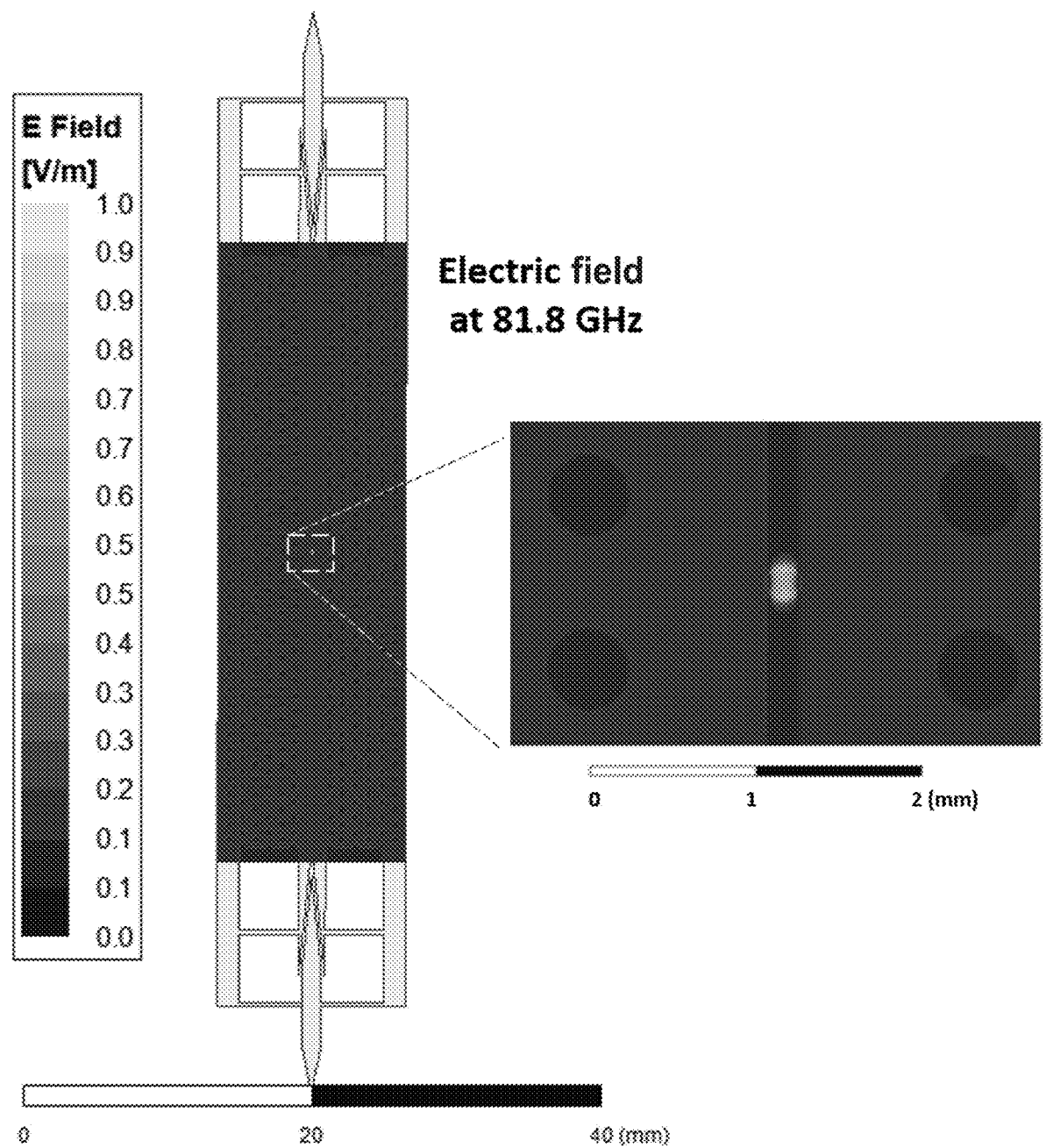
FIG. 3A is a contour map of an electric field, generated in response to a simulated dipole oriented normal to the top surface, for an example photonic crystal maser having a resonant frequency of 81.8 GHz.
Figure 3B:
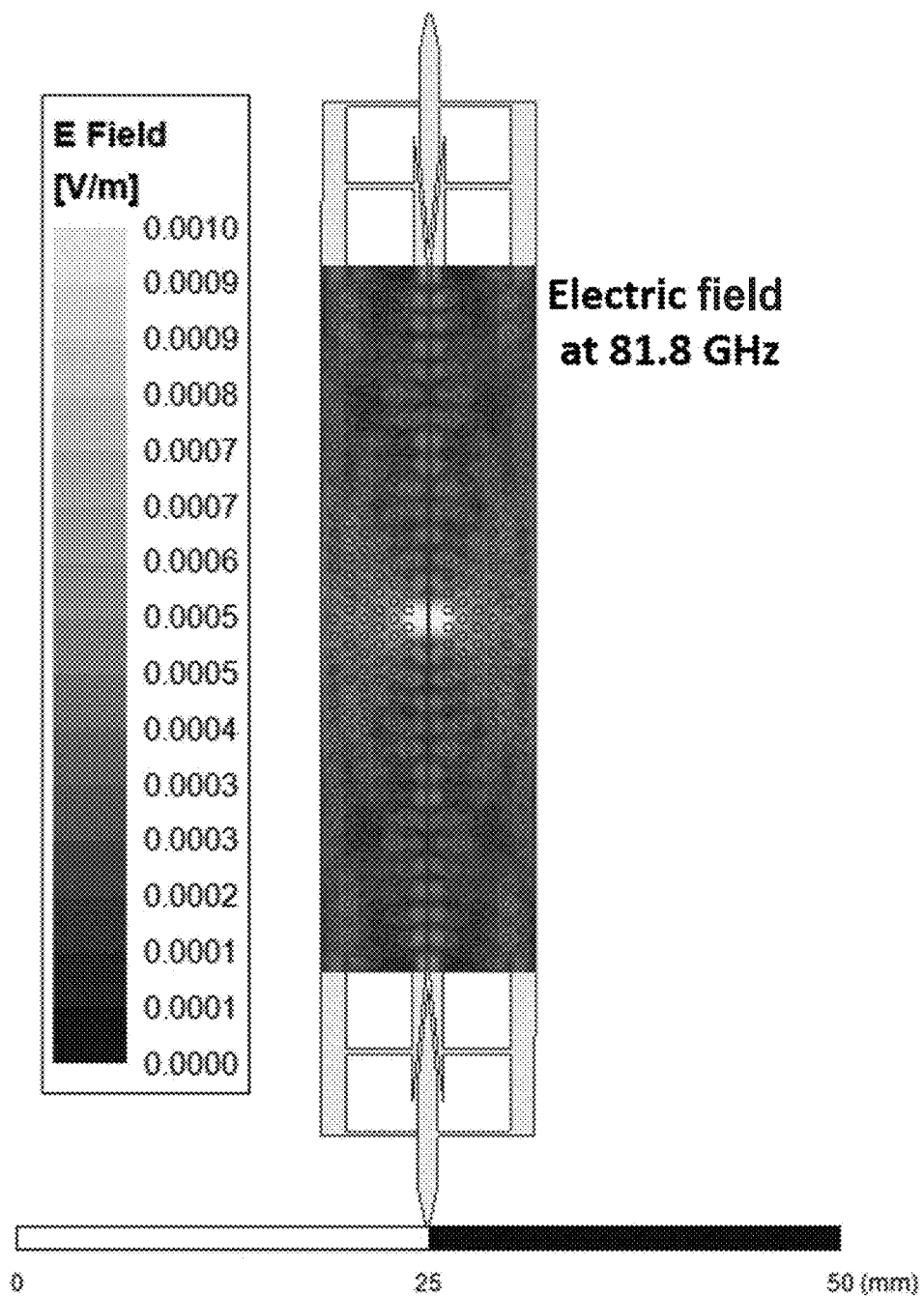
FIG. 3B is a contour map of the electric field of FIG. 3A, but in which the scale is increased by 1000.
Figure 3C:
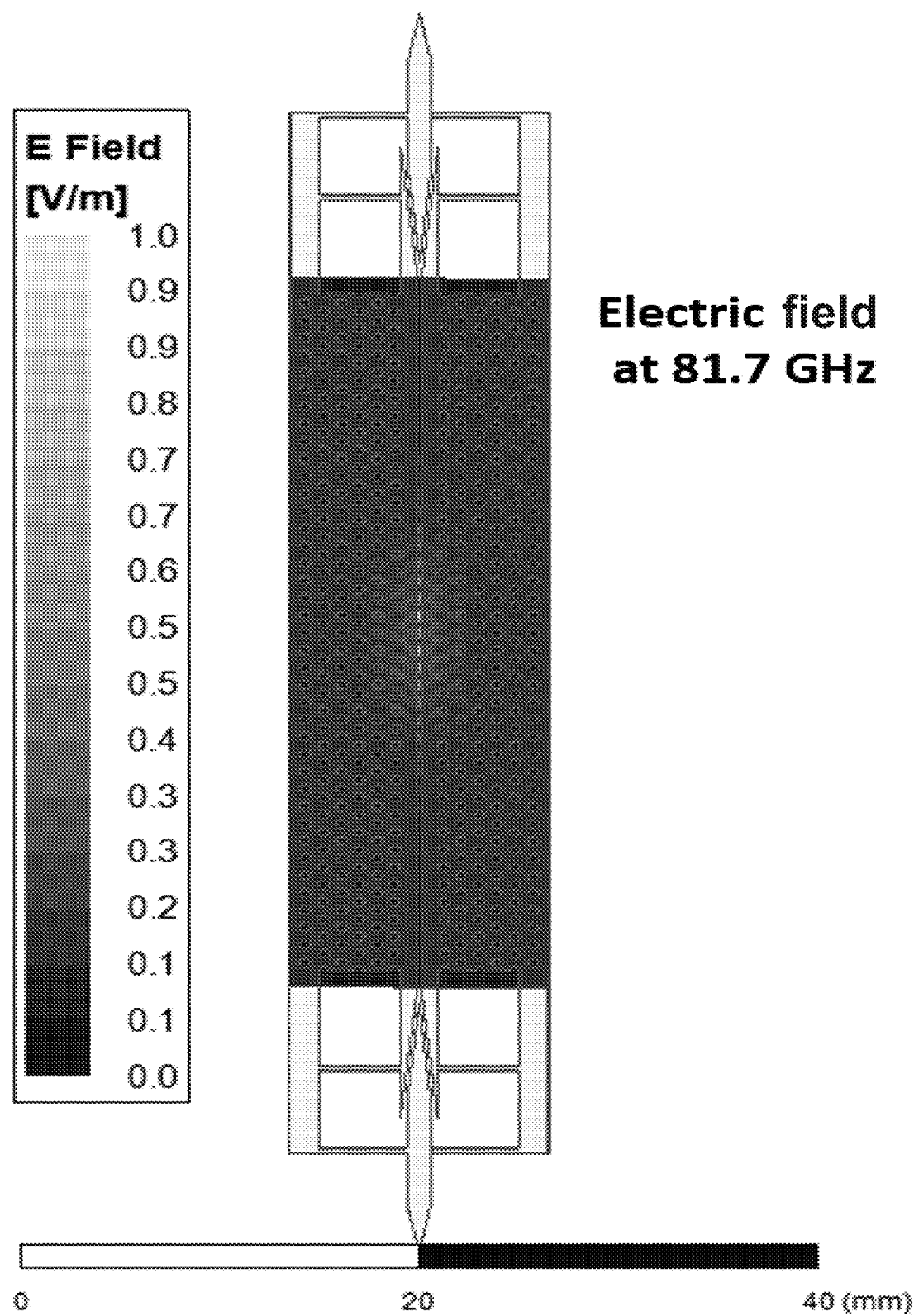
FIG. 3C is a contour map of the electric field of FIG. 3A, but in which the simulated dipole oscillates at 81.7 GHz and is oriented parallel to a top surface of the example photonic crystal maser.
Figure 3D:
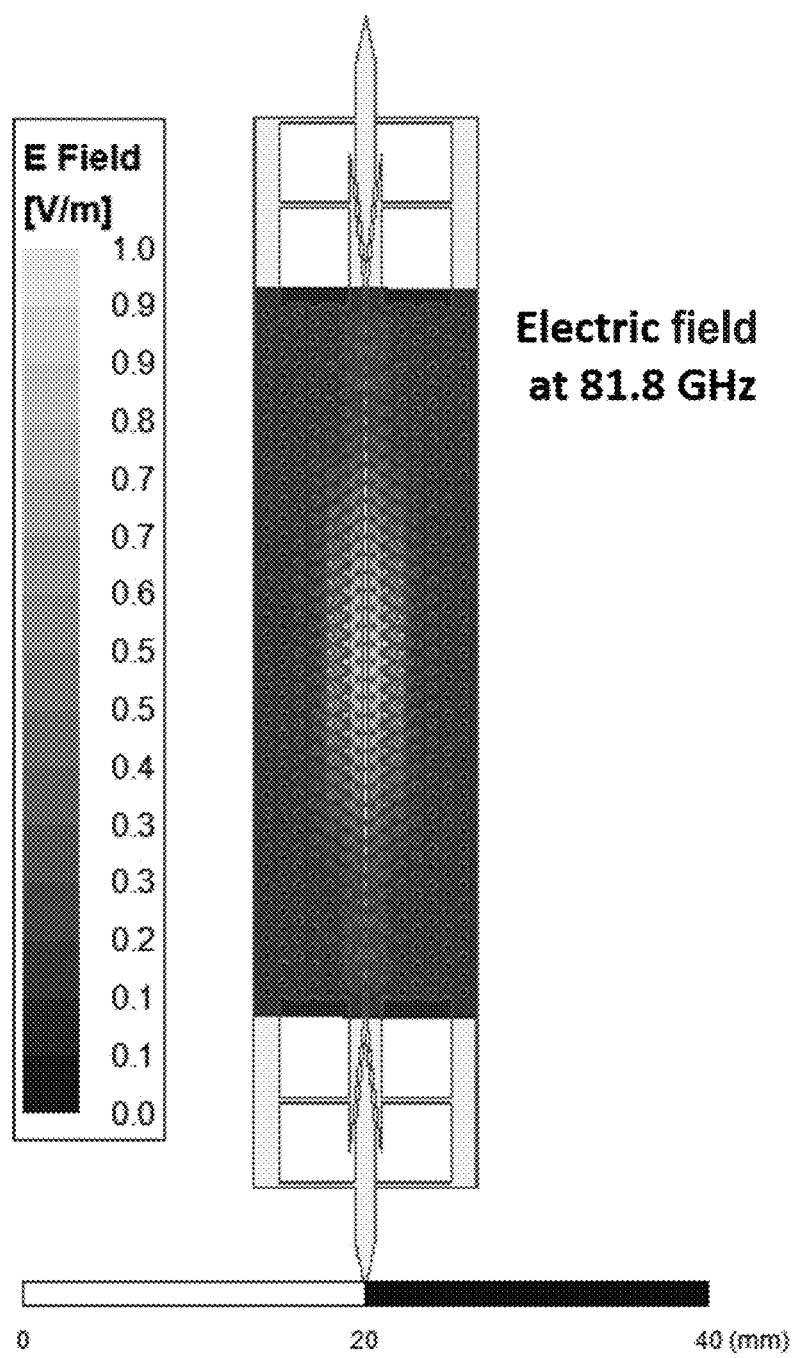
FIG. 3D is a contour map of the electric field of FIG. 3A, but in which the simulated dipole oscillates at 81.8 GHz and is oriented parallel to a top surface of the example photonic crystal maser.
Figure 3E:
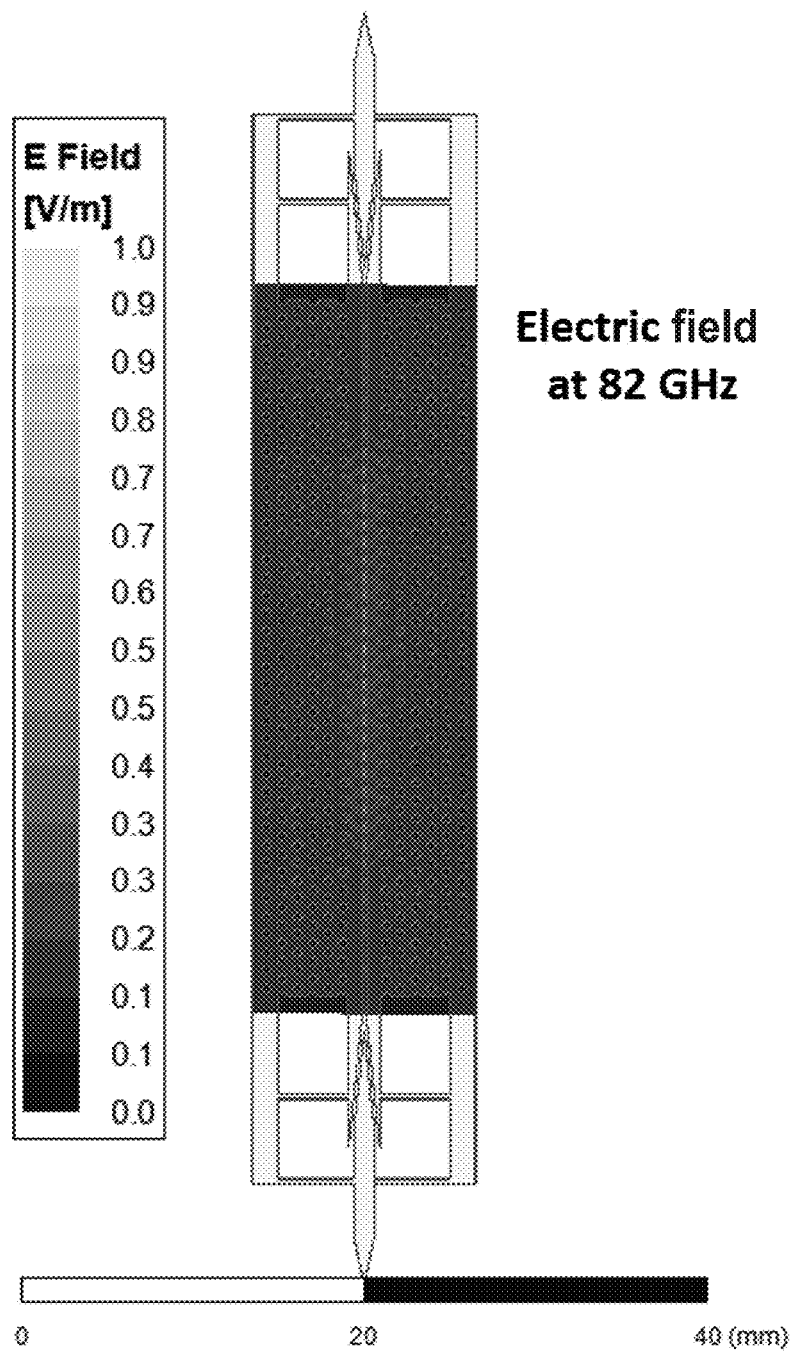
FIG. 3E is a contour map of the electric field of FIG. 3A, but in which the simulated dipole oscillates at 82.0 GHz and is oriented parallel to a top surface of the example photonic crystal maser.

Now referring to FIG. 3A, a contour map of an electric field magnitude is presented for an example photonic crystal maser that has a resonant frequency of 81.8 GHz. The contour map extends through a mid-plane parallel to the top surface of the example photonic crystal maser and includes a slot waveguide therein. The contour map represents a time-averaged magnitude of the electric field in response to a simulated dipole oscillating at the resonant frequency of the example photonic crystal maser. The polarization of the simulated dipole is normal to the top surface. The inset of FIG. 3A provides a magnified view of the contour map showing a magnitude of the electric field proximate a central portion of the slot waveguide. Due to the normal orientation of the simulated dipole, the dipole is poorly coupled to the photonic crystal maser mode as indicated by the small, concentrated magnitude of the electric field in the central portion of the slot waveguide. FIG. 3B presents the contour map of FIG. 3A, but in which the scale is increased by 1000. FIGS. 3C-3E present the counter map of FIG. 3A at different oscillation frequencies of the simulated dipole, but in which the orientation of the dipole is oriented parallel to the top surface and perpendicular to the slot walls. In this orientation, the dipole is strongly coupled to the example photonic crystal maser. The electromagnetic field is enhanced and the emission of the dipole, when on resonance, is strongly coupled to the photonic crystal structure, such as shown in FIG. 3D. Slightly off resonance, there is still some coupling into the photonic crystal maser mode, such as shown in FIG. 3A and FIG. 3B, but this coupling is weaker due to the frequency mismatch between the emission frequency and the resonant mode of the photonic crystal maser.

Photonic crystal cavities and structures are ideal for integrating with vapor cells using contact bonding and machining methods, such as described in U.S. Pat. Nos. 10,859,981 and 11,137,432. A photonic crystal structure that acts as a concentrating element for MHz-THz electromagnetic radiation can have cavities machined in it using lasers (e.g., a Protolaser R laser mill), mechanical machining, or deep reactive ion etching (DRIE). The cavities may be subsequently filled with a vapor (e.g., a gas of alkali atoms) and sealed with optical windows to define a vapor cell. The photonic crystal structures can be designed to concentrate and bunch the incident high frequency electric field in the vapor. Slowing down and concentrating the RF radiation field in the vapor cell increases the radiation rate of atoms in the elongated slot into the waveguide mode of the waveguide.

Figure 4A:
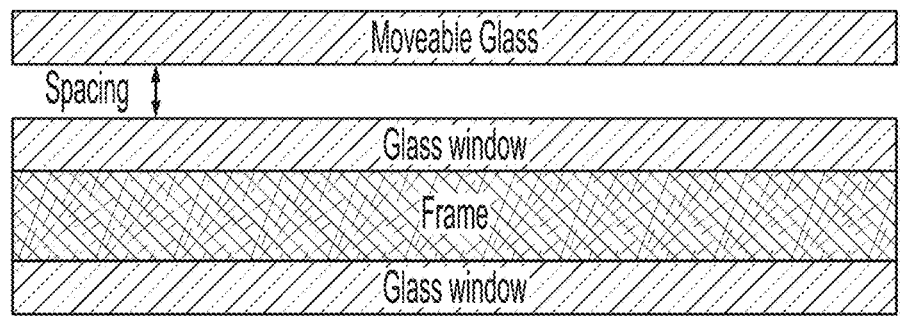
FIG. 4A is a schematic diagram of a cross-section of an example photonic crystal maser that has an optical window and a movable glass piece positioned above the optical window.
Figure 4B:
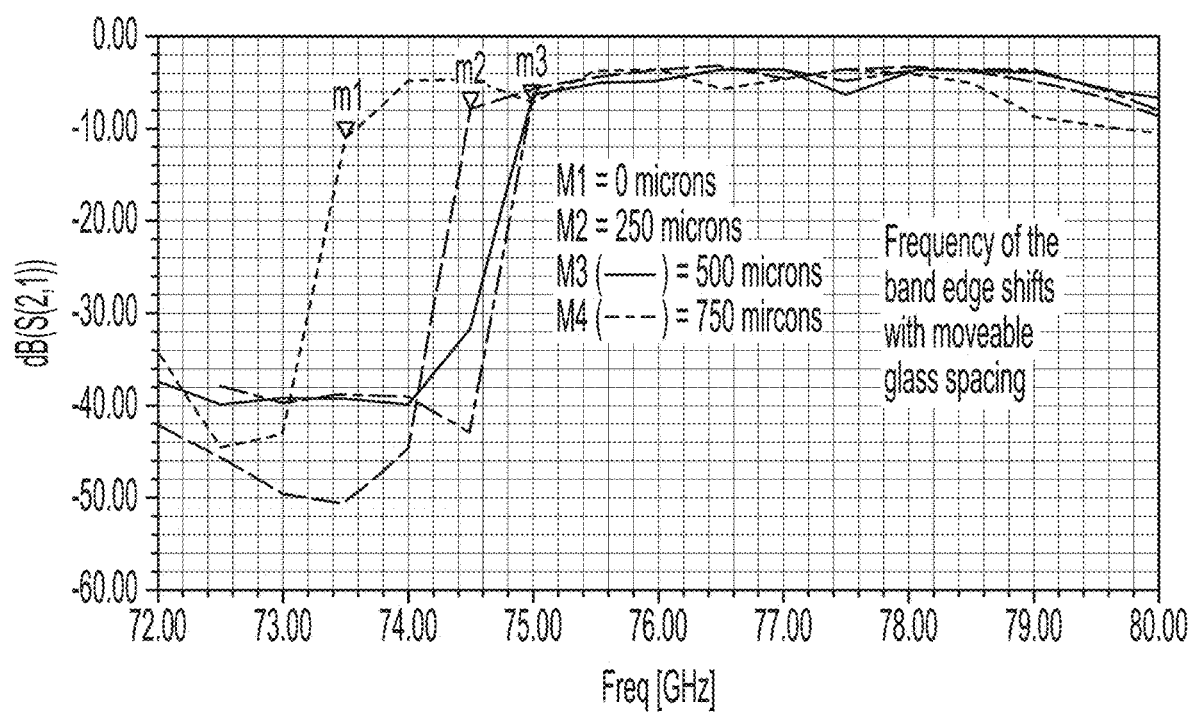
FIG. 4B is a graph of a band edge of the example photonic crystal maser of FIG. 4A, showing how a position of the movable glass piece shifts a frequency position of the band edge.

For example, FIG. 4A presents a schematic diagram of a cross-section of an example photonic crystal maser that has an optical window and a movable dielectric plate positioned above the optical window. The movable dielectric plate (e.g., a movable glass plate, a sapphire plate, etc.) may be used to control a band edge of the example photonic crystal maser. The band edge may be used to slow an RF radiation field along the example photonic crystal maser. FIG. 4B presents a graph of the band edge, showing how a position of the movable dielectric plate shifts a frequency position of the band edge. In particular, the graph shows how the band edge shifts with a magnitude of a gap between the movable dielectric plate and an optical window of the example photonic crystal maser. The moveable dielectric plate can be positioned precisely with a mechanical screw, which may also be formed of a dielectric material. However, other positioning means are possible. In some instances, the example photonic crystal maser includes two instances of the movable dielectric plate, one positioned above each of the two optical windows.

Figure 5:
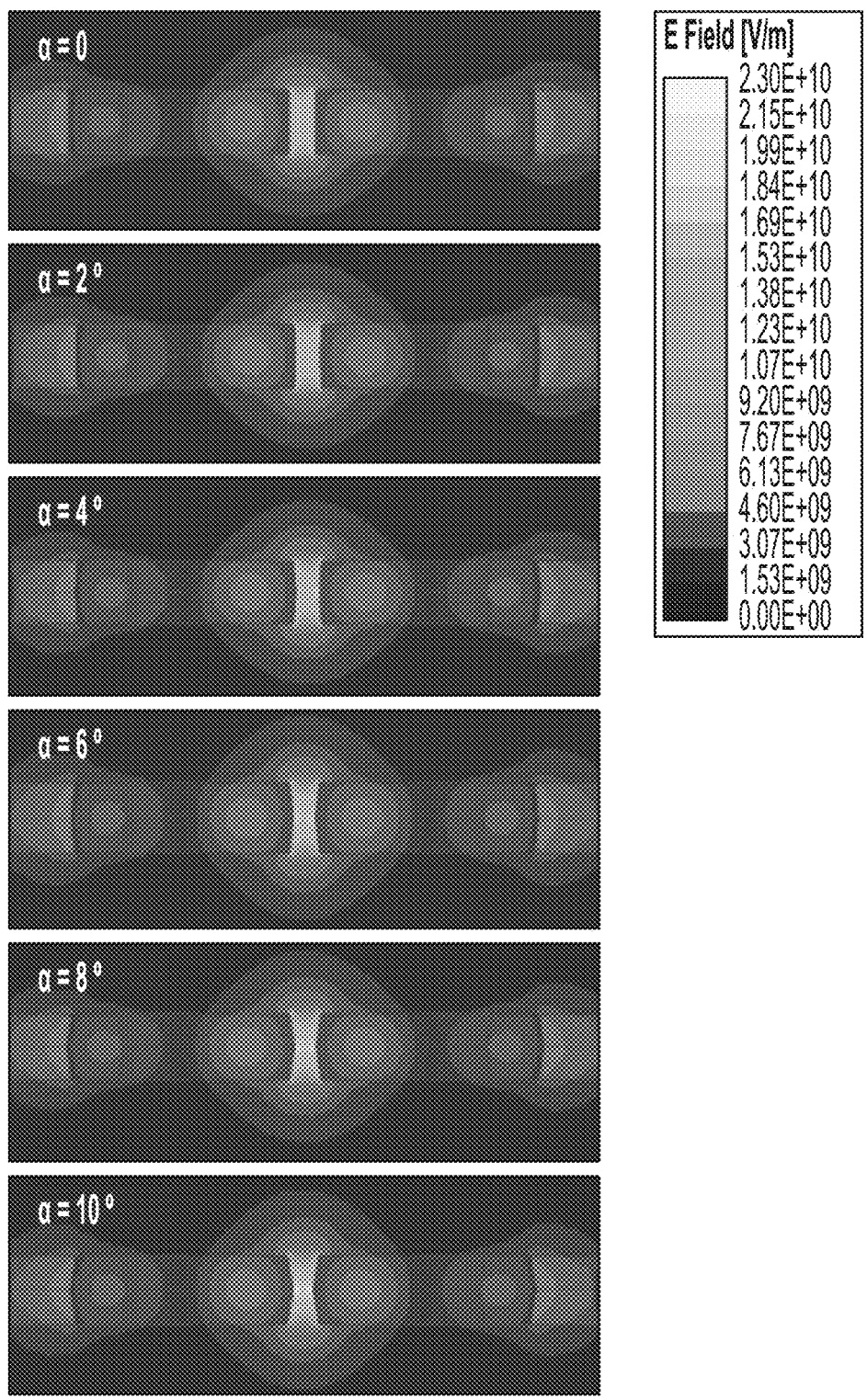
FIG. 5 is a contour map of an electric field magnitude through a cross-section of an example photonic crystal structure.

In another example, FIG. 5 presents a contour map of an electric field magnitude through a cross-section of an example photonic crystal structure. The cross-section includes the elongated slot, which is defined by angled walls. FIG. 5 shows angled walls at angles of $\alpha=0°$, $2°$, $4°$, $6°$, $8°$, and $10°$. However, other angles are possible. The higher wall angles, such that the cross-sectional shape resembles an "hourglass," concentrate the field more in a gap of the elongated slot. The electric field can be increased in magnitude by greater than 10 times. For $\alpha=10°$, FIG. 5 shows an increase of about 30 times over the free electric field.

In some implementations, the photonic crystal maser is based on high dielectric constant materials, such as silicon. These high dielectric constant materials may be contact bonded using processes described in U.S. Pat. Nos. 10,859,981 and 11,137,432. Other high dielectric materials such as $BaLn_2Ti_4O_{12}$ (BLT) can also be used, for example, if adhesion layers are applied. Contact bonding, anodic bonding, or other types of bonding may be used to construct a photonic crystal structure integrated with a vapor cell to create a maser that can output coherent RF electromagnetic radiation. This construction will result in a maser that is fully dielectric and can be integrated with other Rydberg atom-based sensing technologies. For example, the maser may be integrated with Rydberg atom-based sensing technologies for testing in anechoic chambers where signal reception and transmission are both required. Moreover, the maser can enable hetero- and homo-dyning for Rydberg atom sensors with all-dielectric structures, allowing for more elaborate signal processing strategies and phase detection methods. Silicon and glass can be machined using lasers to allow features in these materials with 10 µm precision and 10's of µm sizes. Such dimensional scales are ideal for photonic crystal masers where the photonic crystal structure interacts with RF electromagnetic radiation, since the wavelength of such radiation is much greater than 10 µm.

The use of Rydberg atoms for electrometry can allow accurate and absolute measurements of high frequency (GHz-THz) electric fields (e.g., accurate to about 1 µV $cm^{-1}$). The calculated atomic shot noise limit in the 5-25 GHz range can be about pV $cm^{-1}$ $Hz^{-1/2}$, for standard interaction volumes, determined by the number of participating atoms and the coherence time. The sensitivity limits may be determined by shot noise in the classical readout field. However, Rydberg atom electrometry is primarily used to measure RF electromagnetic fields. For applications in test and measurement and communications it is advantageous to have a source of RF radiation based on the same technology. For example, a dielectric source of RF electromagnetic radiation can be used in test chambers without perturbing the environment. Coupled with Rydberg atom-based sensors, a fully dielectric over-the-air test and measurement system can be setup in a test chamber, increasing accuracy and decreasing the size of the test chamber, consequently reducing cost.

The photonic crystal maser can be used for test and measurement, communications, spectroscopy, timing and referencing frequency. Advantages of the photonic crystal maser may include one or more of the following: [1] an all-dielectric construction that minimizes interference with other nearby devices; [2] masing action that takes place with vapor (e.g., thermal atoms) in a vapor cell; [3] a directional emission that spreads minimally as it propagates; [4] an ability to be combined as a source with Rydberg atom-based sensing technologies. The source can be used for advanced signal processing (mixing strategies), as a signal source in one-box testers, and as a directional communications device; [5] a lightweight, portable configuration that may be less costly than traditional masers. The configuration is based on diode laser technology and vapor cell technology. The same lasers that are used for detection (sensing) may also be used to pump the photonic crystal maser; [6] a construction that can be manufactured more easily than glass blown structures and may also be more robust; [7] an ability to act as an amplifier for Rydberg atom-based receivers. The photonic crystal maser can be integrated into the receiver, for example, as a first stage, or preamp, to increase the signal; [8] an extremely low gain threshold, which can be used to produce low power precisely, thus allowing applications in testing; [9] because of the low masing threshold, the cavity lifetime can be small enabling the output power to be modulated with a high bandwidth (GHz baseband modulation). Such modulation can be achieved by modulating one or more pumping lasers; [10] linearly-polarized output; [11] pulsed and continuous-wave operation; [12] operation over a broad frequency span, such as from 100 MHz-1 THz. Other advantages are possible.

In some implementations, the photonic crystal masers described herein may operate according to the following principles. For example, the average photon number per unit time in the photonic crystal cavity (or elongated slot in a photonic crystal structure) may be represented by Eq. (1):

$$\frac{d\langle n(t)\rangle}{dt} = \left(A - \frac{\omega}{Q}\right)\langle n\rangle + A - B\langle n^2\rangle + 2\langle n\rangle + 1) \qquad \text{Eq. (1)}$$

where $$A = 2r_a\left(\frac{g}{\gamma}\right)^2$$

and $$B = 4A\left(\frac{g}{\gamma}\right)^2$$

Here, Q is the cavity quality factor, $\omega$ is the maser angular frequency, $\langle n^2\rangle$ is the average photon number squared in the cavity of the photonic crystal maser (related to the photon number fluctuations), and $\langle n\rangle$ is the average number of photons in the cavity. The cavity resonant frequency, $\omega_c$, is assumed in resonance with the masing transition, $\omega_c=\omega$. As such, $\langle n^2\rangle$ and $\langle n\rangle$ may be calculated using a density matrix for the system. In the variables A and B, g is the atom-field coupling constant in the cavity, $\gamma$ is the decay rate of upper state and $r_a$ is the number of atoms entering the cavity per second. In steady state, $r_a$ is also the number of atoms leaving the laser atom interaction region per second. The average number of photons in the cavity may be represented by Eq. (2) in steady state:

$$\bar{n}_{ss} = \frac{AQ}{\omega} \times \frac{\left(A - \frac{\omega}{Q}\right)}{B} \qquad \text{Eq. (2)}$$

Eq. (2) provides insight into the difference between maser operation and receiver operation. When A>$\omega$/Q the atoms will emit coherently, the number of photons in the cavity will grow and there will be masing, i.e., A>$\omega$/Q is the threshold condition for masing. If A<$\omega$/Q then the system is in the regime of receiver operation. For example, the Q of a receiver is 1 if the structure has no mirrors, Q~$10^{12}$ Hz, and A~$10^{10}$, making AQ/$\omega$~$10^{-2}$. For the photonic crystal maser above threshold, the steady-state average number of photons can be approximated using Equation (3), $$\bar{n}_{ss} \approx \frac{A^2 Q}{B\omega} \qquad \text{Eq. (3)}$$

The energy stored in the cavity may be determined by the number of photons according to, $$E_{ss}=\hbar\omega\bar{n}_{ss} \qquad \text{Eq. (4)}$$

and the power emitted from the photonic crystal maser may be given by, $$P_{ss} = \frac{E_{ss}}{\tau_c} \qquad \text{Eq. (5)}$$

where $\tau_c$ is the lifetime of the photon in the cavity. Q, $\omega_c$, and $\tau_c$ are all related because they are determined by the properties of the cavity. Ultimately, these properties depend on the reflectivity of the mirrors and losses in the cavity (or elongated slot). The cavity may be assumed to be on resonance so $\omega=\omega_c$. However, solutions for off-resonance are also possible. The cavity Q can be related to the cavity resonant frequency, $\omega_c=\omega$, and the linewidth of the cavity, $\Delta\omega_c=\tau_c^{-1}$ as shown by Eq. (6):

$$Q = \frac{\omega_c}{\Delta\omega_c} = \omega_c\tau_c \qquad \text{Eq. (6)}$$

If $\Delta\omega_c$ and $\omega_c$ are measured, then Q can be determined experimentally, which similarly determines $\tau_c$, since it is the inverse of $\Delta\omega_c$. The reflectivity of the cavity mirrors and estimates of cavity loss can be used to choose a Q for a particular design. This can be seen in Eqs. (7) and (8), $$\Delta\omega=c\alpha_r \qquad \text{Eq. (7)}$$

where $\alpha_r$ is the loss coefficient in the cavity, $$\alpha_r = \alpha_s + \frac{1}{2d}\ln\frac{1}{R_1 R_2} \qquad \text{Eq. (8)}$$

and c is the speed of light. In Equation (8), $\alpha_s$ is the cavity loss and d is the cavity length. $R_1$ and $R_2$ are the cavity mirror reflectivity. From these relations, assuming the photonic crystal maser is well above threshold, $\gamma\approx g$, and that the atom-field coupling has reached the decay constant of the lower state, i.e., saturation, an equation may be derived for the power, $$P_{ss} \approx \frac{\hbar r_a \omega}{2} \qquad \text{Eq. (9)}$$

Eq. (9) for $P_{ss}$ may be interpreted in a straightforward manner and is consistent with other formalisms for finding maser power. Eq. (9) may represent an operation condition where, at saturation, each atom passing through the cavity emits a photon into the cavity. Therefore, the power is determined by the number of active atoms per unit time. This model is consistent with the fundamental operation of a maser, which is to channel the emission of all the atoms into a single mode of the electromagnetic field.

For a Rydberg atom density of $10^{10}$ cm$^{-3}$, just below the density where collisions will become significant (not necessarily a limiting factor but perhaps requiring more pump power), a transit time limited rate $r_a$ of 200 kHz (atoms hit the walls at this rate and are destroyed, but a new atom is excited in the interaction region via the pump lasers); a 100 GHz transition; and a 0.157 cm$^3$ cylindrical pumped atomic volume, corresponding to a 20 cm length and 1 mm diameter interaction region, the photonic crystal maser can produce a power of around 10 nW (−50 dBm). The maser output is polarized parallel to the elongated slot, i.e., parallel to the slab plane of the photonic crystal structure. The steady-state density of Rydberg atoms, $10^{10}$ cm$^3$, is straightforward to produce. Higher powers are possible by increasing the number of atoms and/or the saturation rate. Although this number may be small compared to an antenna, it is significant for testing applications and is a large signal for testing a device's receiving capability. More importantly, the radiation is coherent and directional (e.g., does not spread as the square of the distance). At 100 GHz, a Q=1000 gives a cavity lifetime of $\tau_c$~1 ns. Consequently, the pump lasers can be modulated at high frequency to put large (GHz) bandwidth baseband modulation on the maser output. The ability to produce coherent, directed radiation in an all-dielectric package, with large modulation bandwidth at extremely low powers to test devices precisely is advantageous.

The photonic crystal maser can, in some implementations, be configured to have extremely low threshold powers. For example, the gain cross-section on resonance may be represented by Eq. (9):

$$\sigma_{ul}^r = \sqrt{\frac{\ln(2)}{16\pi^3}} \times \frac{\lambda_{ul}^2 A_{ul}}{n^2 \Delta v} \approx 10^{-5} - 10^{-6} \text{ cm}^2 \qquad \text{Eq. (10)}$$

As shown by Eq. (10), the magnitude of the gain cross-section may be very high. Moreover, the corresponding saturation intensity may be unusually small, as shown by Eq. (11):

$$I_{sat} = \frac{\hbar\omega}{\sigma_{ul}^r \tau_u} \approx 10^{-9} - 10^{-10} W \cdot m^{-2} \qquad \text{Eq. (11)}$$

This value shows that the threshold for masing is very small, allowing for low power operation. Here, Eq. (10) and Eq. (11) use parameters consistent with those of the prior example: $\lambda_{ul}$~0.22 cm; $A_{ul}$~50 kHz; $\Delta\omega$~$2\pi\times100$ kHz; determined by transit time broadening and wall collisions, $\omega$~$2\pi\times$ 100 GHz; and $\tau_u$~5 μs.

If u is a Rydberg state and the atom is in free-space, the radiative decay from u may be dominated by decay to the lowest allowed state because of the $\omega^3$ dependence of the spontaneous emission rate, $A_{ul}$, $A_{lg}$~20 kHz. Typically, $A_{ul}$~20 Hz. Similar spontaneous emission and black-body induced transition rates normally lead to population of other energetically nearby Rydberg states. The condition for effective pumping to state u, $A_{ul} \ll A_{lg}$, is automatically fulfilled given these considerations. However, leakage due to transitions other than u→l may cause the population in these states to disperse amongst a host of different atomic Rydberg states. The addition of the photonic crystal structure, shown in FIG. 3D and FIG. 5, mitigates other competing transitions removing the population from u by changing the electromagnetic mode structure. The photonic crystal structure, comprising the elongated slot, the array of cavities, and the altered array of holes forming the mirrors at each end of the elongated structure, increases the radiation rate into the cavity mode (or waveguide mode) which is energetically the same (in resonance with) the u→l transition. The photonic crystal structure can increase the rate of emission on the u→l transition by greater than a thousandfold even in the absence of large amounts of stimulated emission caused by the build-up of photons in a cavity. This increase means that $A_{ul}$ for the atoms contained in the elongated slot is about 20 kHz. Consequently, emission is largely confined to the u→l transition. The u→i transition shown in FIG. 2 has similar magnitude but can be saturated by the pumping lasers. For example, the pump laser Rabi frequencies must be large enough to maintain a population in u so there is an inversion on the u→l transition. The pump lasers must have an effective Rabi frequency greater than $A_{ul}$ to saturate the population in u. These requirements are straightforward to achieve in beam, vapor cell, and cold atom experiments. The system is effectively a two-level system consisting of the u and l states. FIGS. 3C-3E show that only a dipole oriented to the photonic crystal mode can couple effectively into the photonic crystal structure. The maser emission, then, will be linearly polarized and the u→l transitions will be vertical transitions, $\Delta m=0$.

In a free space description, the photonic crystal maser would saturate when the emission rate u→l in the masing cavity (e.g., the elongated slot) reached the decay rate of l, dominated by spontaneous emission, of about 20 kHz. The saturation of the emission rate occurs when the population in the u an l states become approximately equal thus destroying the population inversion. The saturated emission rate can be increased due to effects such as collisions and transit time broadening (atoms passing through the active region of the gain medium). In the case of the photonic crystal maser, the loss rate of atoms in both the u and the l states is dominated by collisions of the atoms with the walls, ~100-200 kHz, depending on the slot dimensions. Although, the wall collisions can have a negative effect on the u state population, making it more difficult to establish the inversion on the u→l transition, the effect may be compensated by pumping the photonic crystal maser harder. Once the atoms bounce off the walls they are 'recycled' into the beam and can be excited again by the pump lasers. The described effect is not substantially different than maser experiments carried out with an atomic beam, where the atoms passed through the cavity and the decay rate was inversely proportional to the transit time through the cavity. These effects are taken into account in the estimates above of maser power.

Figure 6A:
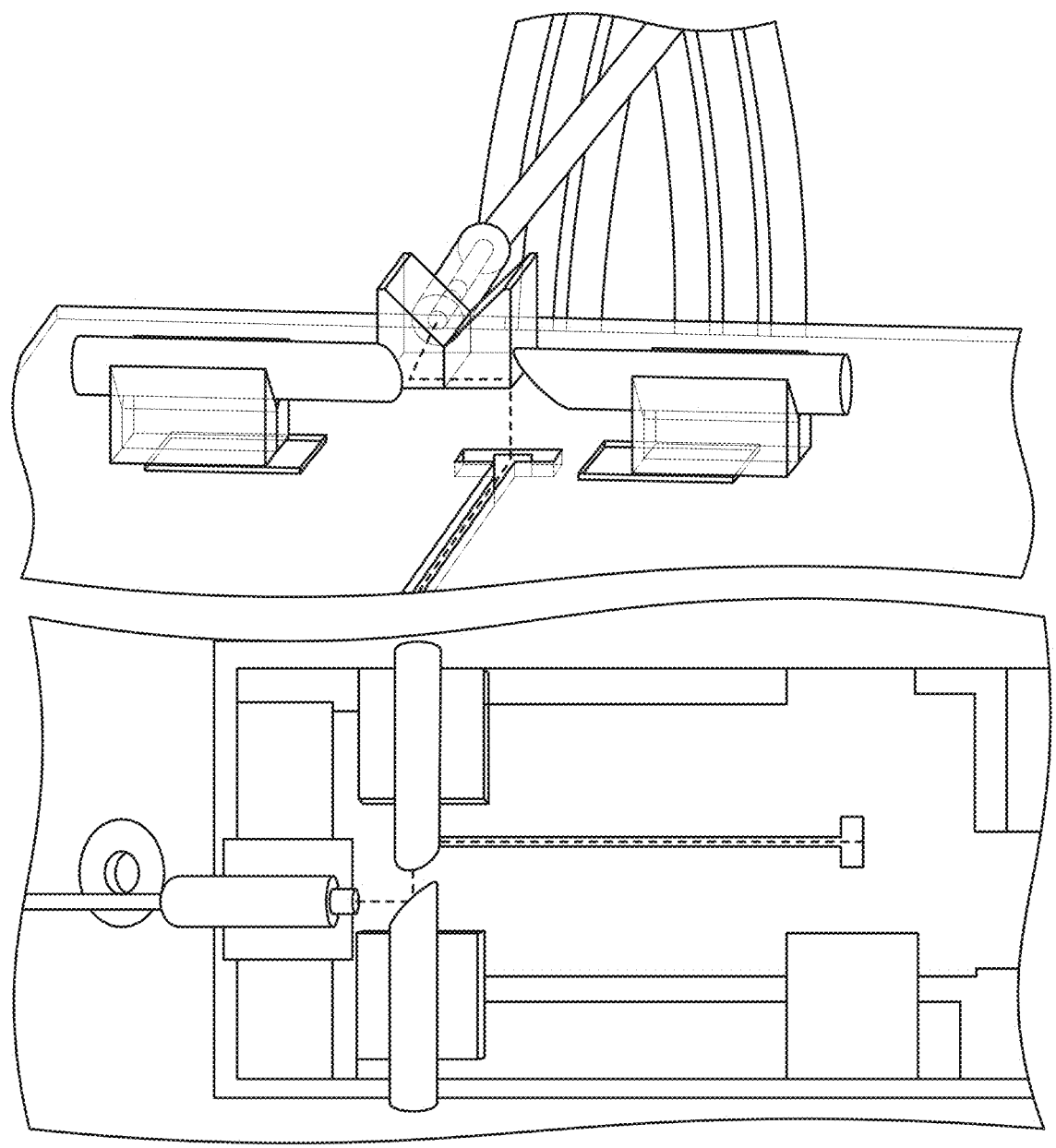
FIG. 6A is a schematic diagram, in perspective and top views, of an example photonic crystal maser that is being optically pumped by a laser.
Figure 6B:
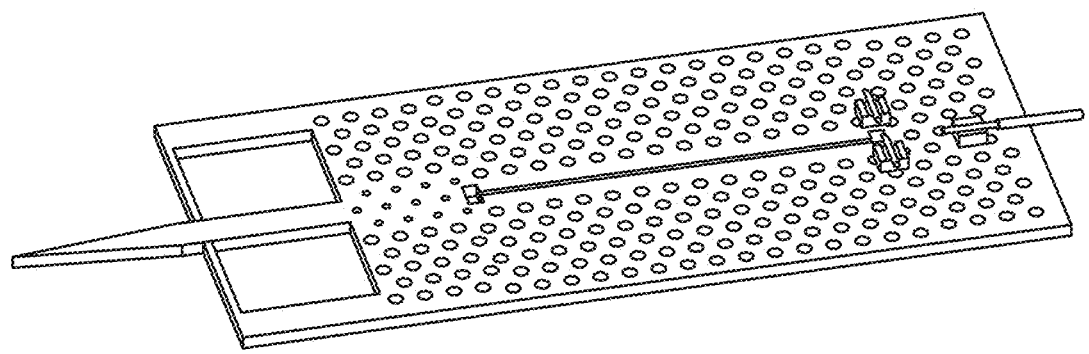
FIG. 6B is a schematic diagram, shown in perspective, of the example photonic crystal maser of FIG. 6A, but in which miniature coupling optics are used to direct light from a pump laser into the example photonic crystal maser.
Figure 6C:
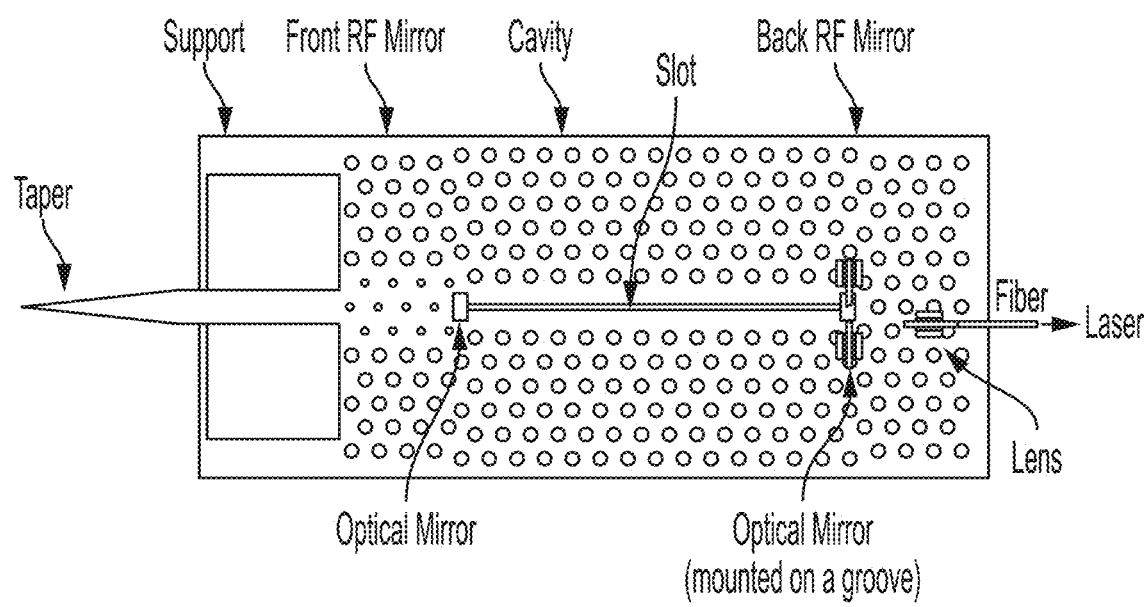
FIG. 6C is a schematic diagram, in top view, of the example photonic crystal maser of FIG. 6A, but in which miniature coupling optics are used to direct light from a pump laser into the example photonic crystal maser.

Pump light can be channeled along the gain media, the atomic sample in the slot, by fiber coupling to a turning mirror located in the slot. FIG. 6A presents a schematic diagram, in perspective and top views, of an example photonic crystal maser that is being optically pumped by a laser. The top portion of FIG. 6A is shown in the perspective view whereas the bottom portion of FIG. 6A presents the top view. A path of a beam from the laser is represented by a dashed line. A mirror on the opposite end of the elongated slot can reflect the light back along the elongated slot to increase the pumping efficiency or direct the reflected light onto a non-reflecting surface. A turning mirror sits in a cut-out at one end of the slot and the light can be directed with mirrors along the length of the slot. Smaller coupling optics than those shown in FIG. 6A can be used to minimize the perturbation of the maser field. For example, FIGS. 6B and 6C present schematic diagrams of the example photonic crystal maser of FIG. 6A, but in which miniature coupling optics are used to direct light from a pump laser into the example photonic crystal maser. The pump light may be polarized to optimize the inversion on the masing transition. Such polarization, may, for example, limit population on the stretched states if the angular momentum of u is larger than l.

The angular spread of the beam is small compared to an antenna which also must be considered when comparing the output power of the two devices (i.e., the photonic crystal maser versus the antenna). The output of the antenna spreads with propagation distance proportionally to $R^2$, with intensity decreasing as $R^{-2}$. The beam of the photonic crystal maser can be made to propagate as a collimated beam. A source spreading out from an antenna, will decrease by roughly 6 orders of magnitude after 1 km of propagation in comparison to a collimated beam. A photonic crystal maser with −50 dBm of output power is roughly equivalent to a 10 dBm antenna source at 1 km. This difference is advantageous for point-to-point communications systems since the power can be low and directional. Coupled with a photonic crystal receiver, a point-to-point, secure communications system can be constructed that uses exceptionally low power, i.e., a Rydberg atom transceiver. Moreover, the output of the photonic crystal maser can be coupled to free space with an antenna structure (or impedance matching structure), as shown in FIG. 1A, or collimated with a lens or a combination thereof. Part of the output coupling structure (e.g., a taper) can include a polarizer.

Tuning of the resonant structure to the masing wavelength can be done in several ways. An example is shown in FIGS. 4A-4B. In FIGS. 4A-4B, a piece of thin glass is moved some distance from the photonic crystal maser to change the effective dielectric constant of the region where the masing wave propagates. FIGS. 4A-4B show a single glass piece but a symmetric structure with a glass piece on each side of the photonic crystal structure can also be used. Various positioning mechanisms, such as a screw made of dielectric material or piezoelectric positioning (if some metal can be tolerated in an application) can be used to position the tuning elements. The positioning screws can be remotely motorized using a drive mechanism. Other tuning mechanisms are possible. For example, tuning can also be done using similar screw and piezoelectric elements. Likewise, the elongated slot can be cut in two or more pieces and the length of the overall structure can be adjusted to put the device into resonance.

Figure 7A:
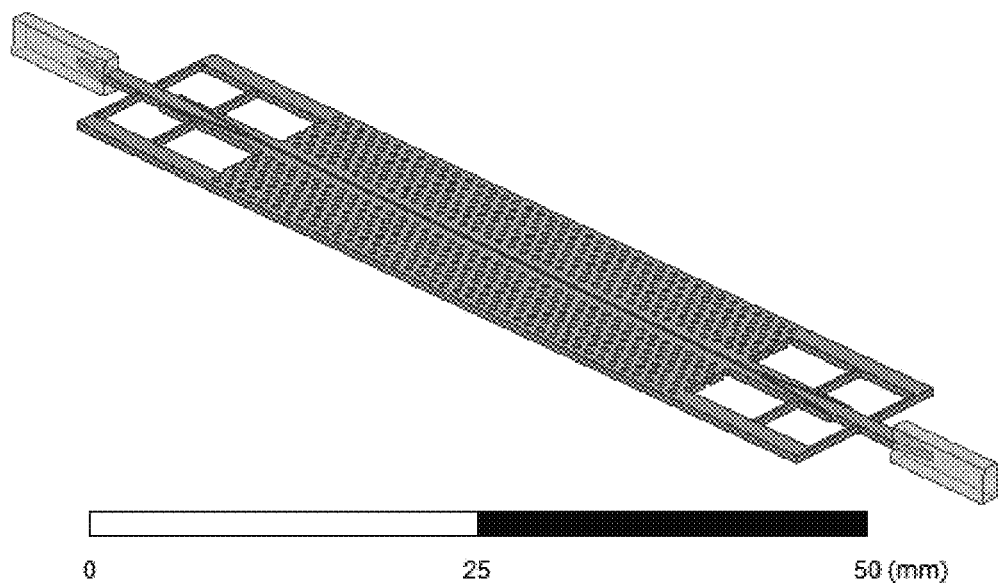
FIG. 7A is a schematic diagram, in perspective view, of an example photonic crystal maser used to determine the enhancement factor for a radiating dipole.
Figure 7B:
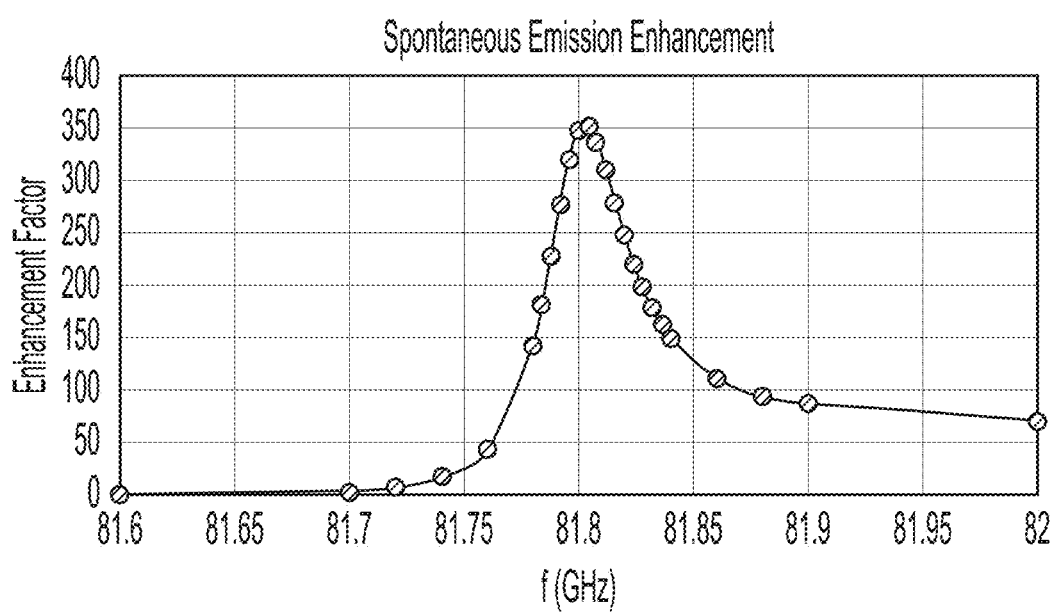
FIG. 7B is a graph of the enhancement factor simulated for the example photonic crystal structure of FIG. 7A.

A calculation of a radiation enhancement factor, $\beta$, is shown in FIGS. 7A-7B. FIG. 7A presents a schematic diagram, in perspective view, of an example photonic crystal structure used to determine the enhancement factor for a radiating dipole. The radiating dipole couples into the resonant mode of the example photonic crystal structure. FIG. 7B presents a graph of the enhancement factor simulated for the example photonic crystal structure of FIG. 7A. The enhancement factor is simulated versus frequency and corresponds to the increase in radiation rate $A_{ul}$ inside the example photonic crystal structure, $A_{eff}=\beta A_{ul}$. The example photonic crystal structure is the same as for the example photonic crystal maser of FIGS. 3A-3E but does not have mirrors in order to determine the enhancement factor for this particular configuration. The peak enhancement is about 365 for this configuration, meaning that the radiation rate inside the photonic crystal structure is 365 $A_{ul}$. FIG. 7B also shows significant enhancement off resonance (e.g., about 100).

In FIGS. 7A-7B, the example photonic crystal structure used for the simulation has the same photonic crystal spacing, hole size and thickness of a maser design, but has no mirrors and is symmetric. The symmetry and lack of mirrors allow the enhancement factor, due to the slowing and concentration of the RF electric field, to be extracted from the simulations. FIG. 7B shows an enhancement factor $\beta=365$ at resonance. If $A_{ul}=20$ Hz for the masing transition and the photonic crystal structure is resonant with the u→l transition, then the radiation rate in the photonic crystal, $A_{eff}$, can be 7 kHz. There is also a significant enhancement of about 100 to the blue side of the band edge. The band edge is shown on the red side of the resonant feature in FIG. 7B where the response is zero. FIGS. 7A-7B indicate that the radiation rate enhancement is sufficient to make the spontaneous emission rate on the u→l transition dominate the decay over transitions to other modes, which are non-resonant with the photonic crystal structure. This dominance is due to the slowing of the electromagnetic wave and the concentration of the electric field in the photonic crystal structure.

FIG. 8 presents a table of example design parameters for a photonic crystal maser. The design parameters correspond to different target frequencies of electromagnetic radiation. The design parameters include a slab thickness, a hole diameter, and a lattice constant for the array. In this set of designs the holes are all circular. However, other hole shapes can be used. Moreover, this set of design parameters corresponds to a silicon frame. However, design parameters for other frames are possible (e.g., a sapphire frame, a BLT frame). In some variations, a size of the elongated slot may be altered as well. For example, the elongated slot may fit into the slab as a line defect that is about 3-6 lattice constants long.

Figure 9A:
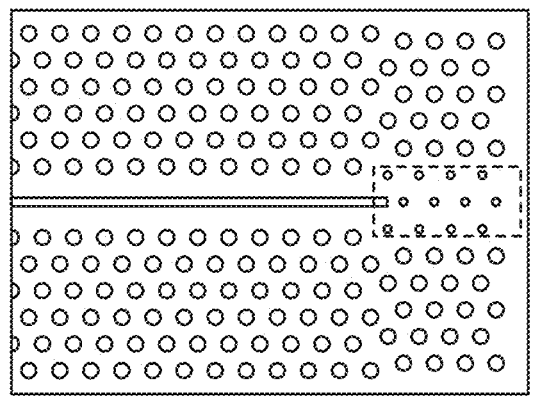
FIG. 9A is a schematic view, in top view, of an example photonic crystal structure having cavities configured to define a photonic crystal mirror proximate an end of an elongated slot.

FIG. 9A presents a schematic view, in top view, of an example photonic crystal structure having cavities configured to define a photonic crystal mirror proximate an end of an elongate slot. The photonic crystal mirror may be partially reflecting. In many variations, such as shown in FIG. 9A, the cavities are holes. By altering the size of the holes proximate the end of the elongated slot, the transmission of the target electromagnetic wave passing through the section of the photonic crystal directly opposite the end can be altered. This altered transmission may be used to tune a reflectivity proximate the end, thereby creating the photonic crystal mirror. The reflectivity of the photonic crystal mirror can vary over a broad range of reflectivity. In FIG. 9A, the altered region of the photonic crystal structure has been extended away from the elongated slot to decrease the leakage through the photonic crystal mirror.

Figure 9B:
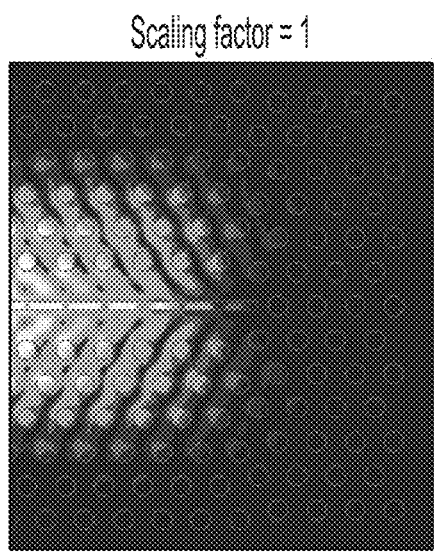
FIG. 9B is a contour graph of electric field pattern for the example photonic crystal structure of FIG. 9A that corresponds to a 97.8% reflection from the photonic crystal mirror.
Figure 9C:
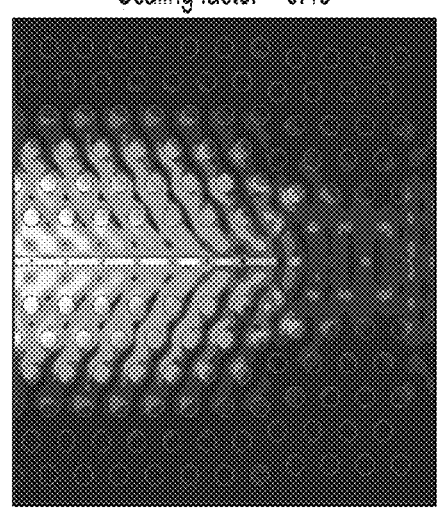
FIG. 9C is a contour graph of electric field pattern for the example photonic crystal structure of FIG. 9A that corresponds to an 88.5% reflection from the photonic crystal mirror.

FIGS. 9B and 9C present contour graphs of electric field patterns that correspond to a 97.8% and an 88.5% reflection from the photonic crystal mirrors. The 97.8% and 88.5% reflections result from, respectively, a scaling factor of 1 and 0.45 for the altered holes. The scaling factor corresponds to a scaling of the hole diameter relative to a reference diameter for the array of holes. FIG. 9D presents a table of reflectivity values for the example photonic crystal structure of FIG. 9A that result from various scaling factors. The table shows that a broad range of reflectivity can be achieved using the approach of FIGS. 9A-9C. However, other methods may be used to control the reflectivity proximate the end of the elongated slot. For example, the hole structure itself may be changed, such as by changing the periodicity of the array of holes.

The photonic crystal masers may also serve as part of a system for generating radio frequency (RF) electromagnetic radiation, especially if a directed source of such radiation is desired. In some implementations, a system for generating radio frequency (RF) electromagnetic radiation includes a maser having a photonic crystal structure and a vapor therein. More specifically, the photonic crystal structure is formed of dielectric material and includes an array of cavities having a defect region disposed therein and an elongated slot disposed in the defect region. The array of cavities and the elongated slot define a waveguide having a waveguide mode. The vapor disposed in the elongated slot includes one or more input electronic transitions and an output electronic transition coupled to the one or more input electronic transitions. The output electronic transition is operable to emit a target RF electromagnetic radiation. Moreover, the output electronic transition is resonant with the waveguide mode of the waveguide. The maser may be analogous to the example photonic crystal masers described in relation to FIGS. 1A-9.

The system also includes a laser system configured to provide input optical signals to the elongated slot of the photonic crystal structure. The input optical signals are capable of exciting the one or more input electronic transitions of the vapor. The laser system may include a fiber optic assembly that optically couples the laser system to the elongated slot. The system additionally includes signal processing electronics in communication with the laser system and configured to control one or more properties of the input optical signals. The one or more properties may include at least one of an intensity, a phase, or a frequency. In some variations, the system includes a data interface in communication with the signal processing electronics and configured to receive signals representing the one or more properties of the input optical signals.

Figure 10:
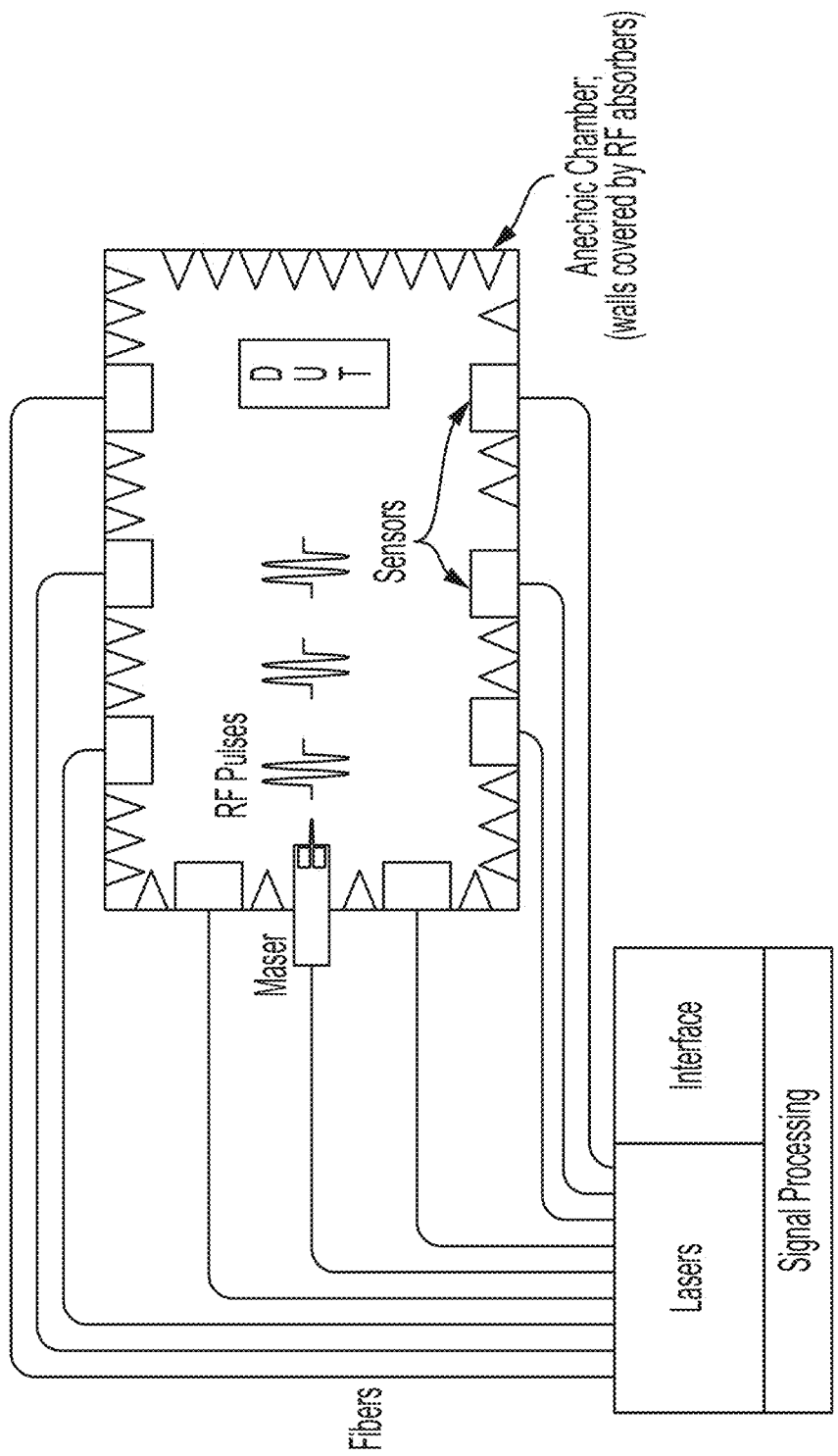
FIG. 10 is a schematic diagram of an example testing system that includes a photonic crystal maser.

Now referring to FIG. 10, a schematic diagram is presented of an example testing system that includes a photonic crystal maser. The photonic crystal maser may be disposed, entirely or in part, in an anechoic chamber that encloses a device-under-test (DUT). The photonic crystal maser may be oriented to transmit an output beam (or RF pulses) to the DUT. The testing system includes a laser system having one or more pump lasers optically coupled to the photonic crystal maser, such as by fiber optics. The laser system may also include one or more lasers optically coupled to predetermined locations in the anechoic chamber. The testing system includes signal processing electronics in communication with the laser system and an interface (or a data interface) in communication with the signal processing electronics. In some variations, the interface may also be in communication with the laser system.

Figure 11:
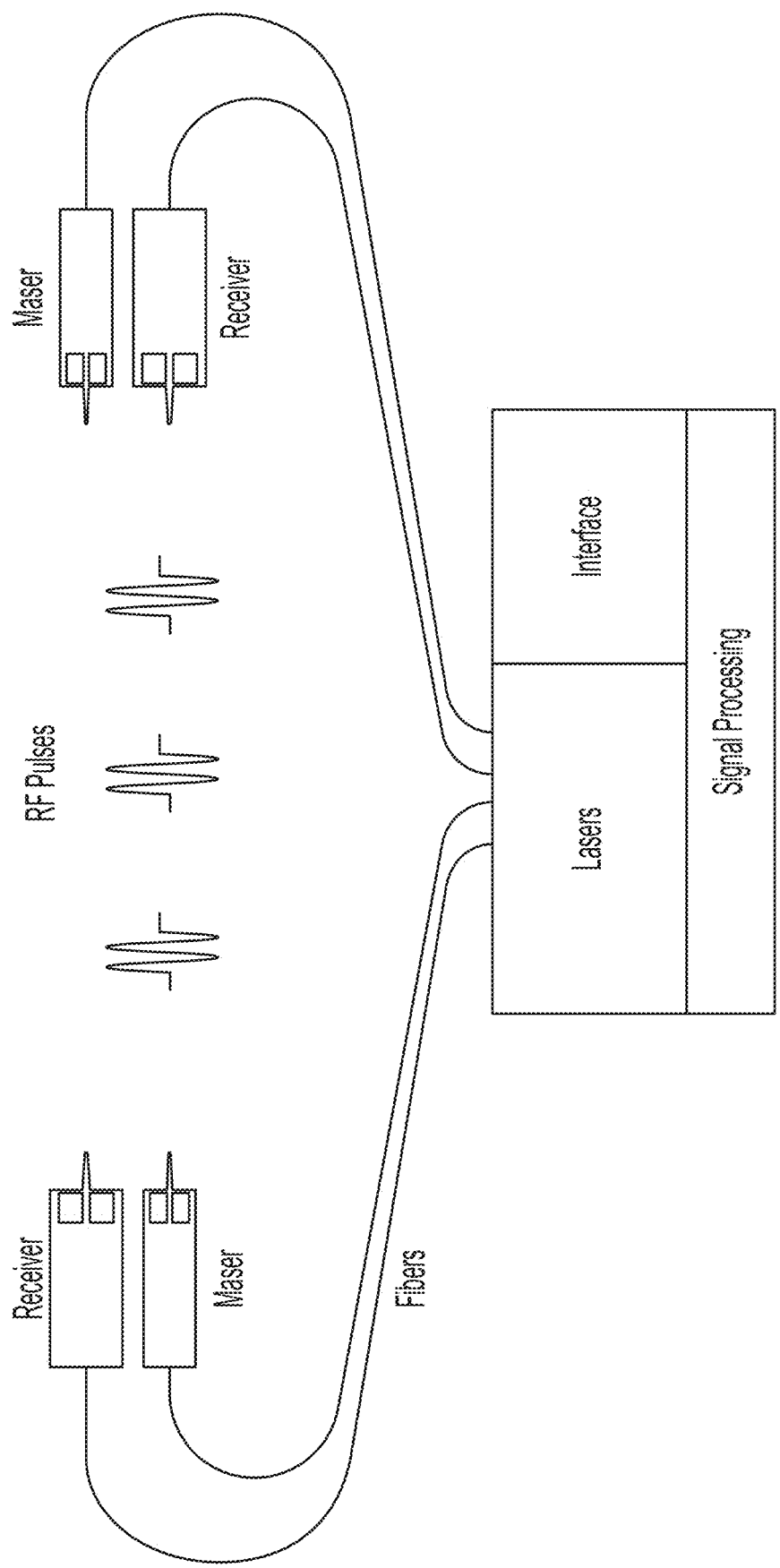
FIG. 11 is a schematic diagram of an example transceiver system that includes two transceivers, each having a photonic crystal maser and a photonic crystal receiver.

Now referring to FIG. 11, a schematic diagram is presented of an example transceiver system that includes two transceivers, each having a photonic crystal maser and a photonic crystal receiver. The transceivers may be oriented towards each other, such as to allow the transmission of RF signals therebetween. The photonic crystal maser may be analogous to the example photonic crystal masers described in relation to FIGS. 1A-9, and the photonic crystal receiver may be analogous to the photonic crystal receivers described in U.S. Pat. No. 11,137,432. The transceivers are optically coupled to a laser system, such as by fiber optics. The laser system may include one or more pump lasers optically coupled to each photonic crystal maser. The laser system may also include one or more probe lasers and one or more coupling lasers optically coupled to each photonic crystal receiver. The transceiver system includes signal processing electronics in communication with the laser system and an interface (or a data interface) in communication with the signal processing electronics. In some variations, the interface may also be in communication with the laser system.

Figure 12:
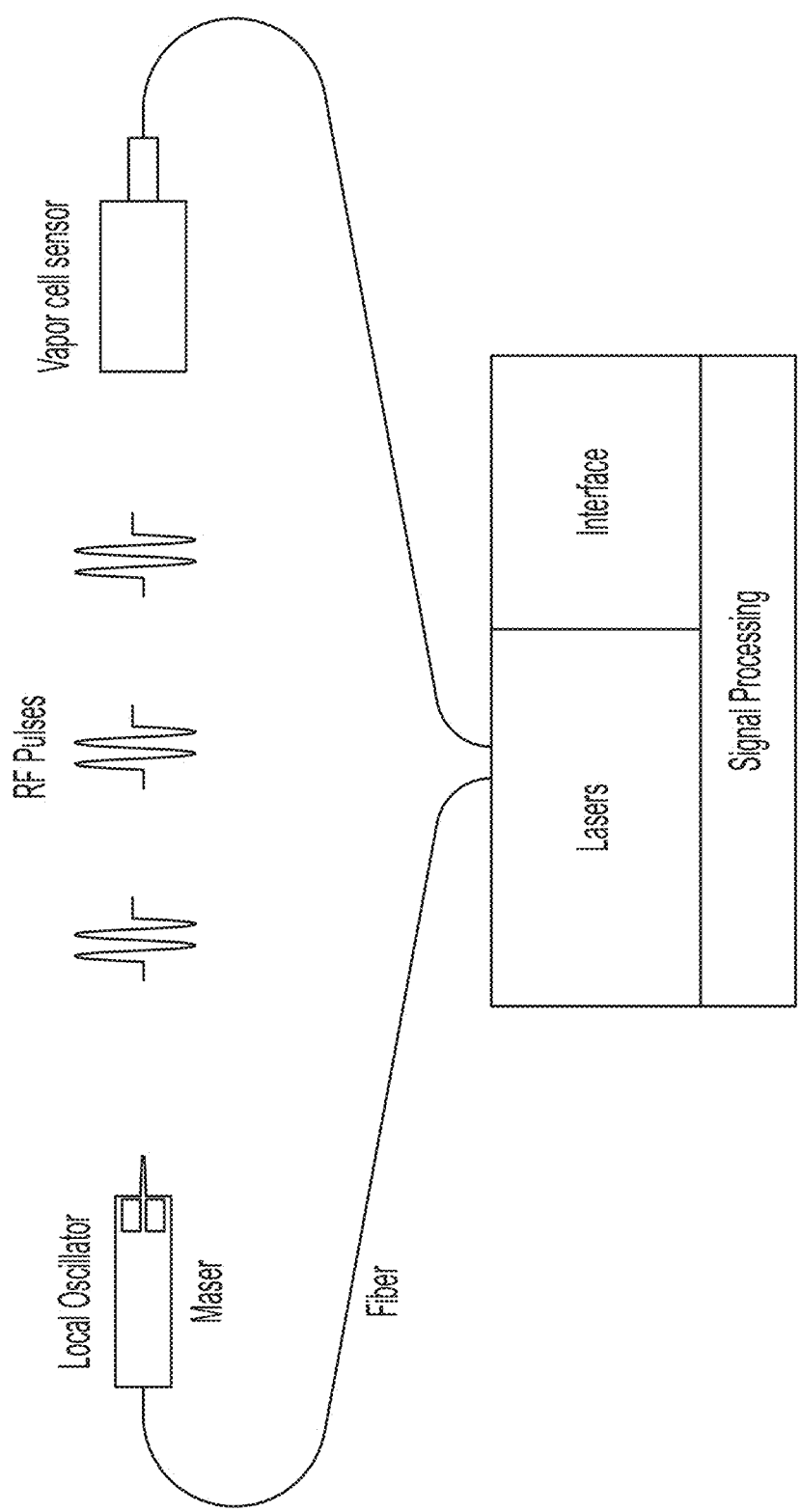
FIG. 12 a schematic diagram of a system that includes a photonic crystal maser and a vapor cell sensor.

Now referring to FIG. 12, a schematic diagram is presented of a system that includes a photonic crystal maser and a vapor cell sensor. The photonic crystal maser may be oriented to transmit an output beam of target RF electromagnetic radiation (or RF pulses) to the vapor cell sensor. The system may include a laser system having one or more pump lasers optically coupled to the photonic crystal maser, such as by fiber optics. The laser system may also include one or more probe lasers and one or more coupling lasers optically coupled to the vapor cell sensor, such as by fiber optics. The system includes signal processing electronics in communication with the laser system and an interface (or a data interface) in communication with the signal processing electronics. In some variations, the interface may also be in communication with the laser system.

In some aspects of what is described, a photonic crystal maser may be described by the following examples:

Example 1. A photonic crystal maser comprising:
  a dielectric body comprising:
    an array of cavities ordered periodically to define a photonic crystal structure in the dielectric body,
    a region in the array of cavities defining a defect in the photonic crystal structure, and
    an elongated slot through the region extending from a slot opening in a surface of the dielectric body at least partially through the dielectric body,
    wherein the array of cavities and the elongated slot define a waveguide having a waveguide mode;
  an optical window covering the elongated slot and having a window surface bonded to the surface of the dielectric body to form a seal about the slot opening;
  a vapor or a source of the vapor in the elongated slot, the vapor comprising:
    one or more input electronic transitions; and
    an output electronic transition coupled to the one or more input electronic transitions and operable to emit a target radiofrequency (RF) electromagnetic radiation, the output electronic transition resonant with the waveguide mode of the waveguide; and
  a laser configured to generate an optical signal capable of exciting the one or more input electronic transitions of the vapor.

Example 2. The photonic crystal maser of example 1, wherein the photonic crystal structure is configured to concentrate the target RF electromagnetic radiation in the elongated slot.

Example 3. The photonic crystal maser of example 1 or example 2,
  wherein the region in the array of cavities extends along an axis and the elongated slot is aligned parallel to the axis; and
  wherein the photonic crystal structure is configured to decrease a group velocity of the target RF electromagnetic along a direction parallel to the axis.

Example 4. The photonic crystal maser of example 1 or any one of examples 2-3, wherein the cavities of the array are disposed on respective sites of a two-dimensional lattice and the region is defined by an absence of cavities on two or more contiguous sites of the two-dimensional lattice.

Example 5. The photonic crystal maser of example 1 or any one of examples 2-4, wherein the array of cavities comprises one or more offset cavities that are spatially offset from an ideal periodic position in the array.

Example 6. The photonic crystal maser of example 5, wherein the one or more offset cavities reside nearest an end of the elongated slot and have respective spatial offsets away from the end of the elongated slot.

Example 7. The photonic crystal maser of example 5, wherein the one or more offset cavities reside nearest a side of the elongated slot and have respective spatial offsets away from the side of the elongated slot.

Example 8. The photonic crystal maser of example 1 or any one of examples 2-7, comprising an optical mirror disposed at an end of the elongated slot.

Example 9. The photonic crystal maser of example 8, wherein the optical mirror is angled relative to an optical pathway defined by the elongated slot.

Example 10. The photonic crystal maser of example 8, wherein the optical mirror is perpendicular to an optical pathway defined by the elongated slot.

Example 11. The photonic crystal maser of example 1 or any one of examples 2-10,
  wherein the region in the array of cavities extends along an axis and the elongated slot is aligned parallel to the axis; and
  wherein the dielectric body comprises an impedance-matching structure that extends from an end of the dielectric body and is aligned with the axis, the impedance-matching structure configured to impedance match the target RF electromagnetic radiation to an ambient environment of the photonic crystal maser.

Example 12. The photonic crystal maser of example 11, wherein the impedance-matching structure terminates in a tapered end and comprises:
a narrow portion aligned with the tapered end; and
an array of co-planar segments extending outward from the narrow portion and having a periodic spacing therealong, the array of co-planar segments configured to filter a polarization of the target RF electromagnetic radiation.

Example 13. The photonic crystal maser of example 1 or any one of examples 2-12,
wherein the window surface is a first window surface;
wherein the optical window comprises a second window surface opposite the first window surface; and
wherein the photonic crystal maser comprises a dielectric plate separated from the second window surface by a gap.

Example 14. The photonic crystal maser of example 1 or any one of examples 2-13, wherein the photonic crystal structure defines a photonic band gap associated with a transverse magnetic (TM) mode of the target RF electromagnetic radiation in the waveguide.

Example 15. The photonic crystal maser of example 1 or any one of examples 2-14, wherein the photonic crystal structure defines a photonic band gap associated with a transverse electric (TE) mode of the target RF electromagnetic radiation in the waveguide.

Example 16. The photonic crystal maser of example 1 or any one of examples 2-15,
wherein the region forms a loop in the array of cavities and the elongated slot extends along a loop axis of the loop to form a looped slot; and
wherein the vapor or the source of the vapor is disposed in at least a portion of the looped slot.

Example 17. The photonic crystal maser of example 16,
wherein the looped slot is associated with first and second loop directions along the loop axis, the first loop direction opposite the second loop direction;
wherein the looped slot comprises first and second RF ports; and
wherein the photonic crystal maser comprises:
first and second directional couplers coupled to, respectively, the first and second RF ports, the first directional coupler configured to receive a first portion of the target RF electromagnetic radiation traveling along the first loop direction, the second directional coupler configured to receive a second portion of the target RF electromagnetic radiation traveling along the second loop direction.

Example 18. The photonic crystal maser of example 1 or any one of examples 2-17,
wherein the surface of the dielectric body defines a cavity opening for each of the array of cavities;
wherein the optical window covers each of the cavity openings; and
wherein the window surface forms a seal about each of the cavity openings.

Example 19. The photonic crystal maser of example 1 or any one of examples 2-17,
wherein the surface of the dielectric body is a first surface and the dielectric body comprises a second surface opposite the first surface;
wherein the elongated slot extends through the dielectric body from the first surface to the second surface;
wherein the slot opening is a first slot opening and the second surface of the dielectric body defines a second slot opening of the elongated slot;
wherein the optical window is a first optical window and the window surface is a first window surface; and
wherein the photonic crystal maser comprises a second optical window covering the second slot opening and having a second window surface bonded to the second surface to form a seal about the second slot opening.

Example 20. The photonic crystal maser of example 19,
wherein the first and second surfaces of the dielectric body define, respectively, first and second cavity openings for each of the array of cavities;
wherein the first and second optical windows cover, respectively, each of the first and second cavity openings; and
wherein the first and second window surfaces form respective seals about each of the first and second cavity openings.

Example 21. The photonic crystal maser of example 1 or any one of examples 2-20,
wherein the target RF electromagnetic radiation has a frequency in a range from 100 MHz to 1 THz.

Example 22. The photonic crystal maser of example 1 or any one of examples 2-21,
wherein the vapor comprises a gas of alkali-metal atoms.

In some aspects of what is described, a method may be described by the following examples:

Example 1. A method comprising:
receiving an optical signal into an elongated slot of a dielectric body, the dielectric body comprising:
an array of cavities ordered periodically to define a photonic crystal structure in the dielectric body,
a region in the array of cavities defining a defect in the photonic crystal structure, and
the elongated slot, positioned in the region and extending from a slot opening in a surface of the dielectric body at least partially through the dielectric body,
wherein:
an optical window covers the elongated slot and has a window surface bonded to a surface of the dielectric body to form a seal about the slot opening, and
the array of cavities and the elongated slot define a waveguide having a waveguide mode; and
emitting a target radio frequency (RF) electromagnetic radiation from a vapor sealed in the elongated slot, the vapor comprising:
one or more input electronic transitions excited by the optical signal, and
an output electronic transition coupled to the one or more input electronic transitions and operable to emit the target RF electromagnetic radiation, the output electronic transition resonant with the waveguide mode of the waveguide; and
amplifying the target RF electromagnetic radiation by resonating at least a portion of the target RF electromagnetic radiation between the output electronic transition and the waveguide mode.

Example 2. The method of example 1, wherein receiving the optical signal into the elongated slot comprises interacting the optical signal with the vapor in the elongated slot.

Example 3. The method of example 2, wherein interacting the optical signal comprises propagating the optical signal along an optical pathway defined by the elongated slot.

Example 4. The method of example 1 or any one of examples 2-3, wherein receiving the optical signal into the elongated slot comprises reflecting the optical signal off a mirror disposed at an end of the elongated slot.

Example 5. The method of example 1 or any one of examples 2-4, comprising:
  directing, by operation of the waveguide, the target RF electromagnetic radiation toward an end of the dielectric body.

Example 6. The method of example 5,
  wherein the region in the array of cavities extends along an axis and the elongated slot is aligned parallel to the axis;
  wherein the dielectric body comprises an impedance-matching structure extending from the end of the dielectric body and aligned with the axis; and
  wherein the method comprises:
    coupling the target RF electromagnetic radiation after emission or amplification to the impedance-matching structure; and
    by operation of the impedance-matching structure, impedance matching the coupled target RF electromagnetic radiation to an ambient environment of the dielectric body.

Example 7. The method of example 6, comprising:
  filtering a polarization of the coupled target RF electromagnetic radiation using a polarizer that is an integral part of the impedance-matching structure.

Example 8. The method of example 1 or any one of examples 2-7, wherein amplifying the target RF electromagnetic radiation comprises concentrating the target RF electromagnetic radiation in the elongated slot.

Example 9. The method of example 1 or any one of examples 2-8,
  wherein the region in the array of cavities extends along an axis and the elongated slot is aligned parallel to the axis; and
  wherein amplifying the target RF electromagnetic radiation comprises decreasing a group velocity of the target RF electromagnetic radiation along a direction parallel to the axis.

Example 10. The method of example 1 or any one of examples 2-9,
  wherein the array of cavities comprises one or more offset cavities that are spatially offset from an ideal periodic position in the array; and
  wherein amplifying the target RF electromagnetic radiation comprises reflecting the target RF electromagnetic radiation off the offset cavities.

Example 11. The method of example 1 or any one of examples 2-10,
  wherein the region forms a loop in the array of cavities and the elongated slot extends along a loop axis of the loop to form a looped slot;
  wherein the vapor is disposed in at least a portion of the looped slot;
  wherein the looped slot is associated with first and second loop directions along the loop axis, the first loop direction opposite the second loop direction; and
  wherein the method comprises:
    propagating a first portion of the target RF electromagnetic radiation along the first loop direction, and
    propagating a second portion of the target RF electromagnetic radiation along the second loop direction.

Example 12. The method of example 1 or any one of examples 2-11, wherein the target RF electromagnetic radiation has a frequency in a range from 100 MHz to 1 THz.

Example 13. The method of example 1 or any one of examples 2-12, wherein the vapor comprises a gas of alkali-metal atoms.

In some aspects of what is described, a system for generating radio frequency electromagnetic radiation may be described by the following examples:

Example 1. A system for generating radio frequency (RF) electromagnetic radiation, the system comprising:
  a maser comprising:
    a photonic crystal structure formed of dielectric material and comprising:
      an array of cavities having a defect region disposed therein, and
      an elongated slot disposed in the defect region,
        wherein the array of cavities and the elongated slot define a waveguide having a waveguide mode, and
    a vapor disposed in the elongated slot and comprising:
      one or more input electronic transitions, and
      an output electronic transition coupled to the one or more input electronic transitions and operable to emit a target RF electromagnetic radiation, the output electronic transition resonant with the waveguide mode of the waveguide;
  a laser system configured to provide input optical signals to the elongated slot of the photonic crystal structure, the input optical signals capable of exciting the one or more input electronic transitions of the vapor;
  signal processing electronics in communication with the laser system and configured to control one or more properties of the input optical signals, the one or more properties comprising at least one of an intensity, a phase, or a frequency.

Example 2. The system of example 1, comprising a data interface in communication with the signal processing electronics and configured to receive signals representing the one or more properties of the input optical signals.

Example 3. The system of example 1 or example 2, wherein the laser system comprises a fiber optic assembly that optically couples the laser system to the elongated slot.

Example 4. The system of example 1 or any one of examples 2-3, wherein the photonic crystal structure is configured to concentrate the target RF electromagnetic radiation in the elongated slot.

Example 5. The system of example 1 or any one of examples 2-4,
  wherein the defect region in the array of cavities extends along an axis and the elongated slot is aligned parallel to the axis; and
  wherein the photonic crystal structure is configured to decrease a group velocity of the target RF electromagnetic radiation along a direction parallel to the axis.

Example 6. The system of example 1 or any one of examples 2-5, wherein the cavities of the array are disposed on respective sites of a two-dimensional lattice and the defect region is defined by an absence of cavities on two or more contiguous sites of the two-dimensional lattice.

Example 7. The system of example 1 or any one of examples 2-6, wherein the array of cavities comprises one or more offset cavities that are spatially offset from an ideal periodic position in the array.

Example 8. The system of example 7, wherein the one or more offset cavities reside nearest an end of the elongated slot and have respective spatial offsets away from the end of the elongated slot.

Example 9. The system of example 7, wherein the one or more offset cavities reside nearest a side of the elongated slot and have respective spatial offsets away from the side of the elongated slot.

Example 10. The system of example 1 or any one of examples 2-9, wherein the photonic crystal structure comprises an optical mirror disposed at an end of the elongated slot.

Example 11. The system of example 1 or any one of examples 2-10,
  wherein the defect region in the array of cavities extends along an axis and the elongated slot is aligned parallel to the axis; and
  wherein the maser comprises an impedance-matching structure that extends from an end of the maser and is aligned with the elongated slot, the impedance-matching structure configured to impedance match the target RF electromagnetic radiation to an ambient environment of the maser.

Example 12. The system of example 11, wherein the impedance-matching structure terminates in a tapered end and comprises:
  a narrow portion aligned with the tapered end; and
  an array of co-planar segments extending outward from the narrow portion and having a periodic spacing therealong, the array of co-planar segments configured to filter a polarization of the target RF electromagnetic radiation.

Example 13. The system of example 1 or any one of examples 2-12,
  wherein the defect region forms a loop in the array of cavities and the elongated slot extends along a loop axis of the loop to form a looped slot; and
  wherein the vapor is disposed in at least a portion of the looped slot.

Example 14. The system of example 13,
  wherein the looped slot is associated with first and second loop directions along the loop axis, the first loop direction opposite the second loop direction;
  wherein the looped slot comprises first and second RF ports; and
  wherein the maser comprises:
    first and second directional couplers coupled to, respectively, the first and second RF ports, the first directional coupler configured to receive a first portion of the target RF electromagnetic radiation traveling along the first loop direction, the second directional coupler configured to receive a second portion of the target RF electromagnetic radiation traveling along the second loop direction.

Example 15. The system of example 1 or any one of examples 2-14, wherein the target RF electromagnetic radiation has a frequency in a range from 100 MHz to 1 THz.

Example 16. The system of example 1 or any one of examples 2-15, wherein the vapor comprises a gas of alkali-metal atoms.

In some aspects of what is described, a method may be described by the following examples:

Example 1. A method comprising:
  generating, by operation of a laser system, input optical signals capable of exciting one or more input electronic transitions of a vapor, the vapor part of a maser that comprises:
    a photonic crystal structure formed of dielectric material and comprising:
      an array of cavities having a defect region disposed therein, and
      an elongated slot disposed in the defect region,
    wherein:
      the array of cavities and the elongated slot define a waveguide having a waveguide mode, and
      the vapor is disposed in the elongated slot and comprises:
        the one or more input electronic transitions, and
        an output electronic transition coupled to the one or more input electronic transitions and operable to emit a target radio frequency (RF) electromagnetic radiation, the output electronic transition resonant with the waveguide mode of the waveguide;
  controlling, by operation of signal processing electronics, one or more properties of the input optical signals, the signal processing electronics in communication with the laser system, the one or more properties comprising at least one of an intensity, a phase, or a frequency; and
  emitting, by operation of the output electronic transition, the target RF electromagnetic radiation from the vapor in response to receiving the input optical signals into the elongated slot.

Example 2. The method of example 1, comprising:
  receiving, at a data interface, signals representing the one or more properties of the input optical signals, the data interface in communication with the signal processing electronics.

Example 3. The method of example 1 or example 2,
  wherein the one or more properties of the input optical signals comprise an intensity of the optical signals;
  wherein controlling the one or more properties of the input optical signals comprises modulating the intensity of the input optical signals to produce pulses of input optical signals; and
  wherein emitting the target RF electromagnetic radiation comprises emitting pulses of the target RF electromagnetic radiation in response to receiving the pulses of input optical signals into the elongated slot.

Example 4. The method of example 1 or any one of examples 2-3, comprising:
  amplifying the target RF electromagnetic radiation by resonating at least a portion of the target RF electromagnetic radiation between the output electronic transition and the waveguide mode.

Example 5. The method of example 4, wherein amplifying the target RF electromagnetic radiation comprises concentrating the target RF electromagnetic radiation in the elongated slot.

Example 6. The method of example 4 or example 5,
  wherein the defect region in the array of cavities extends along an axis and the elongated slot is aligned parallel to the axis; and
  wherein amplifying the target RF electromagnetic radiation comprises decreasing a group velocity of the target RF electromagnetic radiation along a direction parallel to the axis.

Example 7. The method of example 4 or any one of examples 5-6,
  wherein the array of cavities comprises one or more offset cavities that are spatially offset from an ideal periodic position in the array; and
  wherein amplifying the target RF electromagnetic radiation comprises reflecting the target RF electromagnetic radiation off the offset cavities.

Example 8. The method of example 1 or any one of examples 2-7,
wherein the defect region forms a loop in the array of cavities and the elongated slot extends along a loop axis of the loop to form a looped slot;
wherein the vapor is disposed in at least a portion of the looped slot;
wherein the looped slot is associated with first and second loop directions along the loop axis, the first loop direction opposite the second loop direction; and
wherein the method comprises:
propagating a first portion of the target RF electromagnetic radiation along the first loop direction, and
propagating a second portion of the target RF electromagnetic radiation along the second loop direction.
Example 9. The method of example 1 or any one of examples 2-8, comprising:
directing, by operation of the waveguide, the target RF electromagnetic radiation toward an end of the maser.
Example 10. The method of example 9,
wherein the region in the array of cavities extends along an axis and the elongated slot is aligned parallel to the axis;
wherein the maser comprises an impedance-matching structure that extends from the end of the maser and is aligned with the axis; and
wherein the method comprises:
coupling the target RF electromagnetic radiation to the impedance-matching structure; and
by operation of the impedance-matching structure, impedance matching the coupled target RF electromagnetic radiation to an ambient environment of the dielectric body.
Example 11. The method of example 10, comprising:
filtering a polarization of the coupled target RF electromagnetic radiation using a polarizer that is an integral part of the impedance-matching structure.
Example 12. The method of example 1 or any one of examples 2-11, comprises:
conveying, by operation of a fiber optic assembly, the input optical signals from the laser system to the elongated slot.
Example 13. The method example 1 or any one of examples 2-12, wherein the target RF electromagnetic radiation has a frequency in a range from 100 MHz to 1 THz.
Example 14. The method of example 1 or any one of examples 2-13, wherein the vapor comprises a gas of alkali-metal atoms.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A system for generating radio frequency (RF) electromagnetic radiation, the system comprising:
a maser comprising:
a photonic crystal structure formed of dielectric material and comprising:
an array of cavities having a defect region disposed therein, and
an elongated slot disposed in the defect region,
wherein the array of cavities and the elongated slot define a waveguide having a waveguide mode, and
a vapor disposed in the elongated slot and comprising:
one or more input electronic transitions, and
an output electronic transition coupled to the one or more input electronic transitions and operable to emit a target RF electromagnetic radiation, the output electronic transition resonant with the waveguide mode of the waveguide;
a laser system configured to provide input optical signals to the elongated slot of the photonic crystal structure, the input optical signals capable of exciting the one or more input electronic transitions of the vapor;
signal processing electronics in communication with the laser system and configured to control one or more properties of the input optical signals, the one or more properties comprising at least one of an intensity, a phase, or a frequency.

2. The system of claim 1, comprising a data interface in communication with the signal processing electronics and configured to receive signals representing the one or more properties of the input optical signals.

3. The system of claim 1, wherein the laser system comprises a fiber optic assembly that optically couples the laser system to the elongated slot.

4. The system of claim 1, wherein the photonic crystal structure is configured to concentrate the target RF electromagnetic radiation in the elongated slot.

5. The system of claim 1,
wherein the defect region in the array of cavities extends along an axis and the elongated slot is aligned parallel to the axis; and
wherein the photonic crystal structure is configured to decrease a group velocity of the target RF electromagnetic radiation along a direction parallel to the axis.

6. The system of claim 1, wherein the cavities of the array are disposed on respective sites of a two-dimensional lattice and the defect region is defined by an absence of cavities on two or more contiguous sites of the two-dimensional lattice.

7. The system of claim 1, wherein the array of cavities comprises one or more offset cavities that are spatially offset from an ideal periodic position in the array.

8. The system of claim 7, wherein the one or more offset cavities reside nearest an end of the elongated slot and have respective spatial offsets away from the end of the elongated slot.

9. The system of claim 7, wherein the one or more offset cavities reside nearest a side of the elongated slot and have respective spatial offsets away from the side of the elongated slot.

10. The system of claim 1, wherein the photonic crystal structure comprises an optical mirror disposed at an end of the elongated slot.

11. The system of claim 1,
wherein the defect region in the array of cavities extends along an axis and the elongated slot is aligned parallel to the axis; and
wherein the maser comprises an impedance-matching structure that extends from an end of the maser and is aligned with the elongated slot, the impedance-matching structure configured to impedance match the target RF electromagnetic radiation to an ambient environment of the maser.

12. The system of claim 11, wherein the impedance-matching structure terminates in a tapered end and comprises:
a narrow portion aligned with the tapered end; and
an array of co-planar segments extending outward from the narrow portion and having a periodic spacing therealong, the array of co-planar segments configured to filter a polarization of the target RF electromagnetic radiation.

13. The system of claim 1,
wherein the defect region forms a loop in the array of cavities and the elongated slot extends along a loop axis of the loop to form a looped slot; and
wherein the vapor is disposed in at least a portion of the looped slot.

14. The system of claim 13,
wherein the looped slot is associated with first and second loop directions along the loop axis, the first loop direction opposite the second loop direction;
wherein the looped slot comprises first and second RF ports; and
wherein the maser comprises:
first and second directional couplers coupled to, respectively, the first and second RF ports, the first directional coupler configured to receive a first portion of the target RF electromagnetic radiation traveling along the first loop direction, the second directional coupler configured to receive a second portion of the target RF electromagnetic radiation traveling along the second loop direction.

15. The system of claim 1, wherein the target RF electromagnetic radiation has a frequency in a range from 100 MHz to 1 THz.

16. The system of claim 1, wherein the vapor comprises a gas of alkali-metal atoms.

17. A method comprising:
generating, by operation of a laser system, input optical signals capable of exciting one or more input electronic transitions of a vapor, the vapor part of a maser that comprises:
a photonic crystal structure formed of dielectric material and comprising:
an array of cavities having a defect region disposed therein, and
an elongated slot disposed in the defect region, wherein:
the array of cavities and the elongated slot define a waveguide having a waveguide mode, and
the vapor is disposed in the elongated slot and comprises:
the one or more input electronic transitions, and
an output electronic transition coupled to the one or more input electronic transitions and operable to emit a target radio frequency (RF) electromagnetic radiation, the output electronic transition resonant with the waveguide mode of the waveguide;
controlling, by operation of signal processing electronics, one or more properties of the input optical signals, the signal processing electronics in communication with the laser system, the one or more properties comprising at least one of an intensity, a phase, or a frequency; and
emitting, by operation of the output electronic transition, the target RF electromagnetic radiation from the vapor in response to receiving the input optical signals into the elongated slot.

18. The method of claim 17, comprising:
receiving, at a data interface, signals representing the one or more properties of the input optical signals, the data interface in communication with the signal processing electronics.

19. The method of claim 17,
wherein the one or more properties of the input optical signals comprise an intensity of the optical signals;
wherein controlling the one or more properties of the input optical signals comprises modulating the intensity of the input optical signals to produce pulses of input optical signals; and
wherein emitting the target RF electromagnetic radiation comprises emitting pulses of the target RF electromagnetic radiation in response to receiving the pulses of input optical signals into the elongated slot.

20. The method of claim 17, comprising:
amplifying the target RF electromagnetic radiation by resonating at least a portion of the target RF electromagnetic radiation between the output electronic transition and the waveguide mode.

21. The method of claim 20, wherein amplifying the target RF electromagnetic radiation comprises concentrating the target RF electromagnetic radiation in the elongated slot.

22. The method of claim 20,
wherein the defect region in the array of cavities extends along an axis and the elongated slot is aligned parallel to the axis; and
wherein amplifying the target RF electromagnetic radiation comprises decreasing a group velocity of the target RF electromagnetic radiation along a direction parallel to the axis.

23. The method of claim 20,
wherein the array of cavities comprises one or more offset cavities that are spatially offset from an ideal periodic position in the array; and
wherein amplifying the target RF electromagnetic radiation comprises reflecting the target RF electromagnetic radiation off the offset cavities.

24. The method of claim 17,
wherein the defect region forms a loop in the array of cavities and the elongated slot extends along a loop axis of the loop to form a looped slot;
wherein the vapor is disposed in at least a portion of the looped slot;
wherein the looped slot is associated with first and second loop directions along the loop axis, the first loop direction opposite the second loop direction; and
wherein the method comprises:
propagating a first portion of the target RF electromagnetic radiation along the first loop direction, and propagating a second portion of the target RF electromagnetic radiation along the second loop direction.

25. The method of claim 17, comprising:
directing, by operation of the waveguide, the target RF electromagnetic radiation toward an end of the maser.

26. The method of claim 25,
wherein the region in the array of cavities extends along an axis and the elongated slot is aligned parallel to the axis;
wherein the maser comprises an impedance-matching structure that extends from the end of the maser and is aligned with the axis; and
wherein the method comprises:
  coupling the target RF electromagnetic radiation to the impedance-matching structure; and
  by operation of the impedance-matching structure, impedance matching the coupled target RF electromagnetic radiation to an ambient environment of the dielectric body.

27. The method of claim 26, comprising:
filtering a polarization of the coupled target RF electromagnetic radiation using a polarizer that is an integral part of the impedance-matching structure.

28. The method of claim 17, comprises:
conveying, by operation of a fiber optic assembly, the input optical signals from the laser system to the elongated slot.

29. The method of claim 17, wherein the target RF electromagnetic radiation has a frequency in a range from 100 MHz to 1 THz.

30. The method of claim 17, wherein the vapor comprises a gas of alkali-metal atoms.

* * * * *

UNITED STATES PATENT AND TRADEMARK OFFICE
CERTIFICATE OF CORRECTION

PATENT NO. : 11,303,086 B1
APPLICATION NO. : 17/514758
DATED : April 12, 2022
INVENTOR(S) : Amarloo et al.

It is certified that error appears in the above-identified patent and that said Letters Patent is hereby corrected as shown below:

In the Specification

Column 6, Line 24, Delete "100" and insert -- 110 -- therefor

Column 6, Line 61, Delete "152" and insert -- 102 -- therefor

Column 8, Line 62, Delete "118" and insert -- 132 -- therefor

Column 10, Line 34, Delete "114" and insert -- 150 -- therefor

Column 10, Line 54, Delete "112" and insert -- 114 -- therefor

Column 17, Line 36, Delete "$A_{ul}$," and insert -- $A_{ui}$, -- therefor

Signed and Sealed this
Fourteenth Day of June, 2022

Katherine Kelly Vidal
*Director of the United States Patent and Trademark Office*